(12) United States Patent  
Piefer et al.

(10) Patent No.: US 10,978,214 B2  
(45) Date of Patent: Apr. 13, 2021

(54) SEGMENTED REACTION CHAMBER FOR RADIOISOTOPE PRODUCTION

(75) Inventors: Gregory Piefer, Middleton, WI (US); Thomas Rockwell Mackie, Verona, WI (US)

(73) Assignee: SHINE Medical Technologies, LLC, Janesville, WI (US)

( * ) Notice: Subject to any disclaimer, the term of this patent is extended or adjusted under 35 U.S.C. 154(b) by 0 days.

(21) Appl. No.: 13/575,826

(22) PCT Filed: Jan. 28, 2011

(86) PCT No.: PCT/US2011/023024  
§ 371 (c)(1),  
(2), (4) Date: Aug. 13, 2012

(87) PCT Pub. No.: WO2012/003009  
PCT Pub. Date: Jan. 5, 2012

(65) Prior Publication Data  
US 2012/0300890 A1    Nov. 29, 2012

Related U.S. Application Data

(60) Provisional application No. 61/299,258, filed on Jan. 28, 2010.

(51) Int. Cl.  
*G21G 1/08* (2006.01)

(52) U.S. Cl.  
CPC ..................... *G21G 1/08* (2013.01)

(58) Field of Classification Search  
CPC ................... G21C 1/00; G21G 1/08  
USPC ........................... 376/202, 205, 170  
See application file for complete search history.

(56) References Cited

U.S. PATENT DOCUMENTS

| | | |
|---|---|---|
| 2,161,985 A | 6/1939 | Szilard |
| 2,837,476 A | 6/1958 | Busey |
| 2,853,446 A * | 9/1958 | Abbott ............... G21C 3/20 376/172 |
| 2,907,884 A | 10/1959 | Gale |
| 2,992,333 A | 7/1961 | Gale |
| 3,030,543 A | 4/1962 | Luce |
| 3,079,319 A | 2/1963 | McGrath et al. |

(Continued)

FOREIGN PATENT DOCUMENTS

| | | |
|---|---|---|
| CA | 2294063 | 12/1998 |
| CN | 1134197 | 10/1996 |

(Continued)

OTHER PUBLICATIONS

Chinese Patent Office Action for Application No. 200980123452.6 dated Oct. 23, 2014 (14 pages, English translation included).

(Continued)

*Primary Examiner* — Lily C Garner  
(74) *Attorney, Agent, or Firm* — Michael Best & Friedrich LLP

(57) ABSTRACT

A reactor that is operable to produce an isotope includes a region for containing a controlled nuclear fission reaction, the region segmented into a plurality of independent compartments, each of the compartments for containing a parent material in an aqueous solution that interacts with neutrons to produce the isotope via a fission reaction. Also provided are methods of producing an isotope using the same.

18 Claims, 30 Drawing Sheets

(56) References Cited

U.S. PATENT DOCUMENTS

| | | | |
|---|---|---|---|
| 3,085,966 A * | 4/1963 | Flora | G21C 1/04 376/301 |
| 3,218,235 A | 11/1965 | Ehler | |
| 3,258,402 A | 6/1966 | Farnsworth | |
| 3,276,965 A | 10/1966 | Leyse | |
| 3,386,883 A | 6/1968 | Farnsworth | |
| 3,418,206 A | 12/1968 | Hall et al. | |
| 3,448,314 A | 6/1969 | Bounden et al. | |
| 3,473,056 A | 10/1969 | Ferry | |
| 3,530,497 A | 9/1970 | Hirsch et al. | |
| 3,617,908 A | 11/1971 | Greber | |
| 3,624,240 A | 11/1971 | Damm et al. | |
| 3,629,588 A | 12/1971 | Eyrich | |
| 3,634,704 A | 1/1972 | Stix et al. | |
| 3,663,858 A | 5/1972 | Lisitano | |
| 3,668,066 A | 6/1972 | Hendel et al. | |
| 3,676,672 A | 7/1972 | Meckel et al. | |
| 3,713,967 A | 1/1973 | Hamilton et al. | |
| 3,718,836 A | 2/1973 | Bain et al. | |
| 3,719,893 A | 3/1973 | dePackh | |
| 3,746,859 A | 7/1973 | Hilton et al. | |
| 3,794,875 A | 2/1974 | Stark | |
| 3,799,883 A | 3/1974 | Arino et al. | |
| 3,925,676 A | 12/1975 | Bigham et al. | |
| 3,992,625 A | 11/1976 | Schmidt et al. | |
| 4,008,411 A | 2/1977 | Brugger et al. | |
| 4,137,012 A | 1/1979 | Porta et al. | |
| 4,147,590 A * | 4/1979 | Szekely | F02C 1/05 376/223 |
| 4,202,725 A | 5/1980 | Jarnagin | |
| 4,311,912 A | 1/1982 | Givens | |
| 4,314,879 A | 2/1982 | Hartman et al. | |
| 4,370,295 A | 1/1983 | Bussard | |
| 4,431,580 A | 2/1984 | Schneider et al. | |
| 4,528,003 A | 7/1985 | Dittrich et al. | |
| 4,529,571 A | 7/1985 | Bacon et al. | |
| 4,650,630 A | 3/1987 | Boyer | |
| 4,663,110 A | 5/1987 | Cheng | |
| 4,752,432 A | 6/1988 | Bida et al. | |
| 4,793,961 A | 12/1988 | Ehlers et al. | |
| 4,800,060 A | 1/1989 | Goldring | |
| 4,826,646 A | 5/1989 | Bussard | |
| 4,853,173 A | 8/1989 | Stenbacka | |
| 4,976,938 A | 12/1990 | Knize et al. | |
| 5,037,602 A | 8/1991 | Dabiri et al. | |
| 5,053,184 A | 10/1991 | Cluzeau et al. | |
| 5,126,574 A | 6/1992 | Gallagher | |
| 5,152,956 A | 10/1992 | Bernardet et al. | |
| 5,215,703 A | 6/1993 | Bernardet | |
| 5,280,505 A | 1/1994 | Hughey et al. | |
| RE34,575 E | 4/1994 | Klinkowstein et al. | |
| 5,410,574 A | 4/1995 | Masumoto et al. | |
| 5,443,732 A | 8/1995 | Lahoda et al. | |
| 5,468,355 A | 11/1995 | Shefer et al. | |
| 5,482,865 A | 1/1996 | Ferrieri et al. | |
| 5,508,010 A | 4/1996 | Sameh et al. | |
| 5,586,153 A | 12/1996 | Alvord | |
| 5,596,611 A * | 1/1997 | Ball | G21G 1/02 376/186 |
| 5,729,580 A | 3/1998 | Millspaugh | |
| 5,745,536 A | 4/1998 | Brainard et al. | |
| 5,745,537 A | 4/1998 | Verschoore | |
| 5,812,621 A | 9/1998 | Takeda et al. | |
| 5,854,531 A | 12/1998 | Young et al. | |
| 5,870,447 A | 2/1999 | Powell et al. | |
| 5,898,279 A | 4/1999 | Ezzedine et al. | |
| 5,910,971 A | 6/1999 | Ponomarev-Stepnoy et al. | |
| 5,920,601 A | 7/1999 | Nigg et al. | |
| 5,940,461 A | 8/1999 | Takeda et al. | |
| 5,977,554 A | 11/1999 | Smith et al. | |
| 6,011,825 A | 1/2000 | Welch et al. | |
| 6,141,395 A | 10/2000 | Nishimura et al. | |
| 6,337,055 B1 | 1/2002 | Betenekov et al. | |
| 6,417,634 B1 | 7/2002 | Bergstrom | |
| 6,544,606 B1 | 4/2003 | Pennington et al. | |
| 6,567,492 B2 | 5/2003 | Kiselev et al. | |
| 6,593,686 B1 | 7/2003 | Yui | |
| 6,777,699 B1 | 8/2004 | Miley et al. | |
| 6,835,358 B2 | 12/2004 | Hemingway et al. | |
| 6,845,137 B2 | 1/2005 | Ruth et al. | |
| 6,850,011 B2 | 2/2005 | Monkhorst et al. | |
| 6,870,894 B2 | 3/2005 | Leung et al. | |
| 6,891,911 B2 | 5/2005 | Rostoker et al. | |
| 6,907,097 B2 | 6/2005 | Leung | |
| 6,917,044 B2 | 7/2005 | Amini | |
| 6,922,455 B2 | 7/2005 | Jurczyk et al. | |
| 6,925,137 B1 | 8/2005 | Forman | |
| 7,200,198 B2 | 4/2007 | Wieland et al. | |
| 7,230,201 B1 | 6/2007 | Miley et al. | |
| 7,235,216 B2 | 6/2007 | Kiselev et al. | |
| 7,342,988 B2 | 3/2008 | Leung et al. | |
| 7,362,842 B2 | 4/2008 | Leung | |
| 7,419,604 B1 | 9/2008 | Atwood | |
| 7,968,838 B2 | 6/2011 | Dent | |
| 7,978,804 B2 | 7/2011 | Groves et al. | |
| 8,475,747 B1 | 7/2013 | Johnson et al. | |
| 8,767,905 B2 | 7/2014 | Neeley et al. | |
| 2002/0150193 A1 | 10/2002 | Leung et al. | |
| 2003/0152186 A1 | 8/2003 | Jurczyk et al. | |
| 2003/0223528 A1 | 12/2003 | Miley et al. | |
| 2004/0100214 A1 | 5/2004 | Erdman | |
| 2005/0061994 A1 | 3/2005 | Behrouz | |
| 2005/0069076 A1 | 3/2005 | Bricault et al. | |
| 2005/0082469 A1 | 4/2005 | Carlo | |
| 2005/0129162 A1 | 6/2005 | Ruth et al. | |
| 2006/0017411 A1 | 1/2006 | Hamm | |
| 2006/0023829 A1 | 2/2006 | Schenter et al. | |
| 2006/0062342 A1 | 3/2006 | Lepera et al. | |
| 2006/0104401 A1 | 5/2006 | Jongen et al. | |
| 2007/0036261 A1 * | 2/2007 | Kim | G21C 3/02 376/409 |
| 2007/0108922 A1 | 5/2007 | Amaldi | |
| 2007/0133734 A1 * | 6/2007 | Fawcett | G21C 1/303 376/438 |
| 2007/0160176 A1 | 7/2007 | Wada | |
| 2007/0273308 A1 | 11/2007 | Fritzler et al. | |
| 2007/0297554 A1 | 12/2007 | Lavie et al. | |
| 2008/0023645 A1 | 1/2008 | Amelia et al. | |
| 2008/0224106 A1 | 9/2008 | Johnson et al. | |
| 2009/0129532 A1 | 5/2009 | Reyes, Jr. et al. | |
| 2009/0213977 A1 * | 8/2009 | Russell, II | G21G 1/02 376/170 |
| 2009/0225923 A1 * | 9/2009 | Neeley | G21C 1/00 376/186 |
| 2009/0279658 A1 * | 11/2009 | Leblanc | G21C 1/22 376/360 |
| 2009/0316850 A1 | 12/2009 | Langenbrunner | |
| 2010/0063344 A1 | 3/2010 | Kotschenreuther et al. | |
| 2010/0193685 A1 | 8/2010 | Chu et al. | |
| 2010/0284502 A1 | 11/2010 | Piefer | |
| 2011/0051876 A1 * | 3/2011 | Ahlfeld et al. | 376/253 |
| 2011/0091000 A1 | 4/2011 | Stubbers et al. | |
| 2011/0176648 A1 | 7/2011 | Rowland et al. | |
| 2011/0180698 A1 | 7/2011 | Stephenson | |
| 2012/0300890 A1 | 11/2012 | Piefer | |
| 2012/0300891 A1 | 11/2012 | Piefer | |
| 2015/0092900 A1 | 4/2015 | Piefer et al. | |
| 2019/0105630 A1 | 4/2019 | Hasan | |

FOREIGN PATENT DOCUMENTS

| | | | |
|---|---|---|---|
| CN | 1922695 | 2/2007 | |
| CN | 102084434 | 6/2011 | |
| EP | 535235 | 4/1993 | |
| EP | 0632680 | 1/1995 | |
| EP | 1134 771 | 9/2001 | |
| EP | 1233425 A1 * | 8/2002 | G21C 1/303 |
| FR | 2711835 | 5/1995 | |
| GB | 829093 A | 2/1960 | |
| GB | 1187244 A | 4/1970 | |
| JP | 40-24599 | 10/1965 | |
| JP | 59068143 | 4/1984 | |
| JP | 03190097 | 8/1991 | |

(56) References Cited

FOREIGN PATENT DOCUMENTS

| | | |
|---|---|---|
| JP | 6160595 | 6/1994 |
| JP | 09113693 | 5/1997 |
| JP | 11057043 | 3/1999 |
| JP | 2001042098 | 2/2001 |
| JP | 3145555 B2 * | 3/2001 |
| JP | 2001338800 | 12/2001 |
| JP | 2002062388 | 2/2002 |
| JP | 2002214395 | 7/2002 |
| JP | 2005127800 | 5/2005 |
| JP | 2007165250 | 6/2007 |
| JP | 2008102078 | 5/2008 |
| RU | 2004115750 | 5/2005 |
| WO | WO 91/14268 | 9/1991 |
| WO | WO 98/59347 | 12/1998 |
| WO | WO 01/03142 | 1/2001 |
| WO | WO 01/31678 | 5/2001 |
| WO | WO 03/019996 | 3/2003 |
| WO | WO 04/053892 | 6/2004 |
| WO | WO 06/000104 | 1/2006 |
| WO | WO 06/015864 | 2/2006 |
| WO | WO 07/002455 | 1/2007 |
| WO | WO 07/040024 | 4/2007 |
| WO | WO 09/100063 | 8/2009 |
| WO | WO 2009/135163 | 11/2009 |
| WO | WO 2009/142669 | 11/2009 |
| WO | WO 2009135163 A2 * | 11/2009 ............... G21B 1/01 |
| WO | WO 2013187974 | 12/2013 |

OTHER PUBLICATIONS

Japanese Office Action for Application No. 2011/507694 dated Jul. 24, 2014 (3 pages).
United States Patent Office Action for U.S. Appl. No. 12/990,758 dated May 7, 2014 (14 pages).
Japanese Patent Office Action for Application No. 2013-249823 dated Oct. 15, 2015 (6 pages) English translation only.
Canadian Patent Office Action for Application No. 2723224 dated Jun. 5, 2015 (5 pages).
Chinese Patent Office Action for Application No. 200980123452.6 dated Apr. 22, 2015 (7 pages, English translation included).
Japanese Patent Office Action for Application No. 2011-507694 dated Feb. 9, 2015 (3 pages—Statement of relevance included).
Korean Patent Office Action for Application No. 10-2010-7027045 dated Mar. 30, 2015 (10 pages—English translation included).
United States Patent Office Action for U.S. Appl. No. 12/990,758 dated Mar. 23, 2015 (17 pages).
United States Patent Office Action for U.S. Appl. No. 13/460,033 dated Apr. 17, 2015 (13 pages).
Japanese Patent Office action for Application No. 2013-249823 dated Nov. 10, 2014 (2 pages—Statement of relevance included).
Russian Patent Office Action for Application No. 2014144290 dated Oct. 31, 2016 (12 pages with English translation).
Chinese Patent Office Action for Application No. 201380018865.4 dated Nov. 28, 2016 (17 pages with English translation).
Tkac, P. et al., "Speciation of molybdenum (IV) in aqueous and organic phases of selected extraction systems," Separation Science and Technology (2008) 43:2641-2675.
Canadian Patent Office Action for Application No. 2723224 dated Jun. 10, 2016.
Korean Patent Office Action for Application No. 10-2010-7027045 dated Feb. 15, 2016.
Chinese Patent Office Action for Application No. 201380018865.4 dated Feb. 2, 2016.
European Patent Office Action for Application No. 09739965.3 dated Nov. 26, 2015.
United States Patent Office Action for U.S. Appl. No. 13/460,033 dated Mar. 7, 2016 (12 pages).
United States Patent Office Action for U.S. Appl. No. 12/990,758 dated Jul. 21, 2016 (14 pages).

Korean Patent Office Action for Application No. 10-2016-7015856 dated Sep. 27, 2016 (11 pages with English translation).
Japanese Patent Office Action for Application No. 2013-249823 dated Aug. 16, 2016 (3 pages with English translation).
United States Patent Office Action for U.S. Appl. No. 13/460,033 dated Feb. 1, 2017 (10 pages).
United States Patent Office Notice of Allowance for U.S. Appl. No. 12/990,758 dated Apr. 10, 2017 (8 pages).
Canadian Patent Office Action for Application No. 2,723,224 dated Mar. 30, 2017 (4 pages).
Chinese Patent Office Action for Application No. 201510976878.3 dated Mar. 3, 2017 (22 pages, English translation included).
Russian Patent Office Decision to Grant a Patent for Invention dated for Application No. 2014144290 dated Jan. 26, 2018 (14 pages).
Keele et al. "Solubility relations of uranyl fluoride-hydrofluoric acid-boric acid." Journal of Chemical and Engineering Data 17.3 (1972): 330-332.
United States Patent Office Action for U.S. Appl. No. 14/390,658 dated Apr. 20, 2018 (14 pages).
Chinese Patent Office Action for Application No. 2013800188654 dated Apr. 17, 2018 (7 pages, English translation included).
Chinese Patent Office Action for Application No. 2013800188654 dated Jul. 26, 2017 (16 pages, English translation included).
Chinese Patent Office Action for Application No. 201510976878.3 dated Nov. 13, 2017 (10 pages).
United States Patent Office Action for U.S. Appl. No. 13/460,033 dated Nov. 16, 2017 (18 pages).
United States Patent Office Action for U.S. Appl. No. 13/460,033 dated Jun. 26, 2018 (17 pages).
Canadian Patent Office Action for Application No. 2,869,559 dated Jan. 22, 2020 (4 pages).
United States Patent Office Action for U.S. Appl. No. 15/644,497 dated Feb. 10, 2020 (16 pages).
United States Patent Office Notice of Allowance for U.S. Appl. No. 13/460,033 dated Mar. 24, 2020 (8 pages).
United States Patent Office Action for U.S. Appl. No. 14/390,658 dated Apr. 6, 2020 (11 pages).
United States Patent Office Action for U.S. Appl. No. 14/390,658 dated Jul. 18, 2019 (11 pages).
United States Patent Office Action for U.S. Appl. No. 13/460,033 dated Aug. 15, 2019 (37 pages).
United States Patent Office Action for U.S. Appl. No. 15/644,497 dated Jul. 16, 2019 (17 pages).
Korean Patent Office Action for Application No. 10-2014-7031068 dated Aug. 28, 2019 (10 pages, English translation included).
Bürck et al., "Sorption Behaviour of Molybdenum on Different Metal Oxide Ion Exchangers," Solvent Extraction and Ion Exchange 6.1, 1988, 167-182. Abstract available online: <https://www.tandfonline.com/doi/abs/10.1080/07366298808917930>.
Canadian Patent Office Action for Application No. 2,869,559 dated Jan. 25, 2019 (4 pages).
United States Patent Office Action for U.S. Appl. No. 14/390,658 dated Dec. 28, 2018 (14 pages).
United States Patent Office Action for U.S. Appl. No. 13/460,033 dated Jan. 10, 2019 (21 pages).
"The Burr Amendment" "2005 Energy Act," Congressional Record, pp. S7237-S7244 (Jun. 23, 2005).
"The Schumer Amendment" "Comprehensive Report on H.R. 776" Congressional Record, p. H12103 (Oct. 5, 1992).
"U.S. Radioisotope Supply," American Nuclear Society Position Statement 30:(Jun. 2004).
Abraham, S., "Remarks by Energy Secretary Spencer Abraham on the Global Threat Reduction Initiative," Speech to the International Atomic Energy Agency, Vienna, Austria, (May 26, 2004).
Agostinelli, S., et al, "Geant4—A Simulation Toolkit," Nuclear Instruments and Methods in Physics Research A, 506:250-303 (2003).
Angelone, M. et al., "Conceptual Study of a Compact Accelerator-Driven Neutron Source for Radioisotope Production, Boron Neutron Capture Therapy and Fast Neutron Therapy," Nuc. Instr. & Methods in Physics Res. A:487:585-594 (2002).

(56) References Cited

OTHER PUBLICATIONS

Armstrong, D.D. et al., "Progress Report on Testing of a 100-kV, 125-mA Deuterium Injector," IEEE Transactions on Nuclear Science NS-26, No. 3 (1979).

Armstrong, D.D. et al., "Tests of the Intense Neutron Source Prototype" IEEE Transactions on Nuclear Science NS-26, No. 3 (1979).

Austen, I., "Reactor Shutdown Causing Medical Isotope Shortage," The New York Times, (Dec. 6, 2007).

Bakel, A.J. et al., "Thermoxid Sorbents for the Separation and Purification of 99Mo," 26th International Meeting on RERTR, Vienna, Austria, (Nov. 7-12, 2004).

Ball, R.M. et al., "Present Status of the Use of LEU in Aqueous Reactors to Produce Mo-99," 1998 International Meeting on Reduced Enrichment for Research and Test Reactors, Sao Paulo,(Oct. 18-23, 1998).

Barbry, F. "Criticality Accident Studies and Research Performed in the Valduc Criticality Laboratory, France," IAEA-TECDOC-1601: 39-48 (2008).

Barnett, C.F., "Atomic Data for Fusion, vol. 1: Collisions of H, H2, He and Li Atoms with Molecules," ORNL "Redbooks" 6086 (1990).

Barschall, H.H., "Intense Sources of Fast Neutrons," Ann. Rev. Nuclear Part. Sci. 28:207-237 (1978).

Biodex, Pulmonex II® Xenon System: http://www.biodex.com/radio/lungvent/lung_502feat.htm. Accessed: (Jun. 1, 2010).

Bosch, H., et al. "Improved Formulas for Fusion Cross-Sections and Thermal Reactivities," Nuclear Fusion 32:4: 611-631 (1992).

Bradley, E. et al., "Homogeneous Aqueous Solution Nuclear Reactors for the Production of Mo-99 and Other Short Lived Radioisotopes," IAEA-TECDOC-1601: 1-13 (2008).

Brown, R. W., "The Radiopharmaceutical Industry's Effort to Migrate Toward Mo-99 Production Utilizing LEU," The 2005 RERTR International Meeting, (Nov. 6-10, 2005).

Bunker, M.E. "Status Report on the Water Boiler Reactor," Los Alamos Technical Reports LA-2854 (Oct. 1963).

Calamai, P., "Chalk River Crisis Sired by AECL," TheStar.com, (Jan. 19, 2008).

Cappiello, C. et al., "Lessons Learned from 64 Years of Experience with Aqueous Homogeneous Reactors," Los Alamos National Laboratory Report LA-UR-10-02947 (May 2010).

Celona, L. et al., "Status of the TRASCO Intense Proton Source and Emittance Measurements," Rev. of Sci. Instrum. 75:5: 1423 (2004).

Chakin, V.P., et al. "High dose neutron irradiation damage in beryllium as blanket material," Fusion Engineering and Design 58-59: 535-541 (Nov. 2001).

Chenevert, G.M. et al., "A Tritium Gas Target as an Intense Source of 14 MeV Neutrons," *Nucl. Instr. and Methods* 145: 149-155 (1977).

Cheng, Z. et al., "Preliminary Study of 99Mo Extraction Process from Uranly[sic]-Nitrate Fuel Solution of Medical Isotope Production Reactor," Homogeneous Aqueous Solution Nuclear reactors for the Production of Mo-99 and Other Short Lived Radioisotopes, IAEA-TECDOC-1601: 27-35 (2008).

Cipiti, B.B., "Fusion Transmutation of Waste: Design and Analysis of the In-Zinerator Concept," Sandia Report, SAND2006-6590, (Nov. 2006).

Cohilis, P., "Recent Advances in the Design of a Cyclotron-Driven, Intense, Subcritical Neutron Source," *Proc. of the Fifth European Particle Physics Conference*, EPAC'96, (Jun. 10-14, 1996).

Committee on Medical Isotope Production Without Highly Enriched Uranium, National Research Council of the National Academies. Medical Isotope Production Without Highly Enriched Uranium. The National Academies Press, Washington, DC (2009). http://www.nap.edu/catalog.php?record_id=12569 Accessed (Jun. 1, 2010).

Conner, C. et al., "Production of Mo-99 from LEU Targets Acid-side Processing," 2000 Meeting on Reduced Enrichment for Research and Test Reactors, Las Vegas, Nevada, (Oct. 1-6, 2000).

DeJesus, O.T. et al., "Preparation and Purification of 77Br-Labeled p-Bromospiroperidol Suitable for in vivo Dopamine Receptor Studies," J. Label. Comp. Radiopharm., 20: 745-756 (1983).

Deluca, P.M., "Performance of a Gas Target Neutron Source for Radiotherapy," Phys. Med. Biol., 23:5: 876-887 (1978).

Demchenko, P.O., "A Neutron Source on a Basis of a Subcritical Assembly Driven by a Deuteron Linac," Problems of Atomic Science and Technology, 46:2:31-33 (2006).

Department of Defense. "Technology Readiness Assessment (TRA) Deskbook," (May 2005).

European Patent Office Action for Application No. 09739965.3 dated Sep. 19, 2012 (4 pages).

Evaluated Nuclear Data File (ENDF): http://www-nds.iaea.org/exfor/endf.htm. Database Version of May 31 (2010). Accessed (May 3, 2010).

Fraser, S., "Special Examination Report on Atomic Energy of Canada Limited—2007," OAG Special Examination Report on Atomic Energy of Canada Limited, (Jan. 29, 2008).

Ganjali, M.R. et al., "Novel Method for the Fast Separation and Purification of Molybdenum(VI) from Fission Products of Uranium with Aminofunctionalized Mesoporous Molecular Sieves (AMMS) Modified by Dicyclohexyl-18-Crown-6 and S-N Tetradentate Schiff's Base," Analytical Letters, 38:1813-1821 (2005).

Gobin, R. et al., "High Intensity ECR Ion Source (H+, D+, H– Developments at CEA/Saclay," Rev. of Sci. Instrum. 73:2: 922 (2002).

Gohar, Y., "Accelerator-driven Subcritical Facility: Conceptual Design Development," Nuclear Instruments and Methods in Physics Research A, 562:870-874 (2006).

Hamilton, T., "Reactor Shutdown Leaves Cancer Patients in Limbo," TheStar.com, (Dec. 5, 2007).

IAEA, "Alternative Technologies for 99mTc Generators," IAEA-TECDOC-852, (Dec. 1995).

Kahn, L.H., "The Potential Dangers in Medical Isotope Production," The Bulletin Online, (Mar. 17, 2008).

King, LDP; Hammond, RP; Leary, JA; Bunker, ME; Wykoff, WR. "Gas Recombination System for a Homogeneous Reactor," Nucleonics 11:9:25-29 (Sep. 1953).

Kitten, S. et al., "Solution-reactor-produced Mo-99 using activated carbon to remore[sic] I-131," Los Alamos National Laboratory Report, LA-UR—98-522 (Jun. 1998).

Kulcinski, G.L. "Near Term Commercial Opportunities from Long Range Fusion Research," 12th Annual Meeting on the Technology of Fusion Power, (Jun. 16-20, 1996).

Kulcinski, G.L., et al., "Alternate Applications of Fusion-Production of Radioisotopes" Fusion Science and Technology 44:559 (2003).

Kuperman, A.J., "Bomb-Grade Bazaar," Bulletin of the Atomic Scientists, 62:2:44-50 (Mar./Apr. 2006).

Kwan, J.D. et al., "A 2.45 GHz High Current Ion Source for Neutron Production," 17th International Workshop on ECR Ion Sources and Their Applications, Lanzhou, China, (Sep. 17-21 2006).

Maclachlan, A. "NRG to Study Potential for Use of LEU for Mo-99," Nuclear Fuel, 32:26, (Dec. 17, 2007).

MDS-Nordion. "Mo-99 Fact Sheet: Molybdenum-99 Fission Radiochemical": http://www.nordion.com/documents/products/Mo-99_Bel.pdf (2009). Accessed (Jun. 1, 2010).

Meade, C. et al., "Considering the Effects of a Catastrophic Terrorist Attack," RAND Center for Terrorism Risk Management Policy Report, (2006).

Mirzadeh, S., "Production Capabilities in U.S. Nuclear Reactors for Medical Radioisotopes," ORNL report, ORNL/TM-12010, (Nov. 1992).

Mutalib, A., "Full Scale Demonstration of the Cintichem Process for the Production of Mo-99 Using a Low Enriched Target," ANL Report ANL/CMT/CP-97560, (Sep. 1999).

Newsline, "Shortage of Molybdenum-99 Due to Strike at NRU Reactor," The Journal of Nuclear Medicine, 38:8, (Aug. 1997).

Nickles, R.J. "Production of a Broad Range of Radionuclides with an 11 MeV Proton Cyclotron," J Label Comp Radiopharm 30:120 (1991).

(56) References Cited

OTHER PUBLICATIONS

Nortier, F.M. et al., "Investigation of the thermal performance of solid targets for radioisotope production," Nuel. Instr. and Meth. A 355:236 (1995).
Ogawa, K; et al., "Development of solution behavior observation system under criticality accident conditions in TRACY," Journal of Nuclear Science and Technology 37:12:1088-1097 (Dec. 2000).
Osso, J.A., "Preparation of a Gel of Zirconium Molybdate for use in the Generators of 99Mo-99mTc Prepared with 99Mo Produced by the 98Mo(n,γ)99Mo Reaction," 1998 International Meeting on Reduced Enrichment for Research and Test Reactors, (Oct. 18-23, 1998).
Piefer, G. "Performance of a Low Pressure, Helicon Driven IEC Helium-3 Fusion Device," Ph.D. Thesis (Dec. 2006).
Risler, R., "20 Years of Clinical Therapy Operation with the Fast Neutron Therapy System in Seattle," Proceedings of the Seventeenth International Conference on Cyclotrons and Their Applications, (Oct. 18-22, 2004).
Schueller, M.J. et al., "Production and Extraction of 10CO2 From Proton Bombardment of Molten 10B2O3." Am Inst Physics Press (Oct. 2002).
Sherman, J. "High-Current Proton and Deuterium Extraction Systems," *Proceedings of the 2007 Particle Accelerator Conference*, Albuquerque, NM: 1835 (2007).
Sherman, J.D. et al., "A 75-keV, 140-mA Proton Injector," Rev. of Scientific Instruments 73:2 917 (Feb. 2002).
Sherman, J.D. et al., "Proton Injector for cw-Mode Linear Accelerators," AIP Conf. Proc. 1099: 102 (2008).
Song, Z. et al., "Minipermanent Magnet High-Current Microwave Ion Source," Rev. of Sci. Instrum. 77 03A305 (2006).
Stacey, W.M, "Capabilities of a DT Tokamak Fusion Neutron Source for Driving a Spent Nuclear Fuel Transmutation Reactor," Nuclear Fusion, 41:2:135-154 (2001).
Taylor, T. et al., "An Advanced High-Current Low-Emittance dc Microwave Proton Source," Nucl. Instrum. and Methods in Phys. Res Part A 336:1 (1993).
Underhill, DW. "The Adsorption of Argon, Krypton and Xenon on Activated Charcoal," Health Phs. 71:2:160-166 (1996).
Vandegrift, G. "ANL (GFV) Perspective on Conversion of Mo-99 Production from High- to Low-Enriched Uranium," Presentation to the National Academies Committee on Medical Isotope Production without Highly Enriched Uranium, Washington D.C. (Apr. 10, 2007).
Vandegrift, G. F. et al., "RERTR Progress in Mo-99 Production from LEU," 6th International Topical Meeting Research Reactor Fuel Management (RRFM), Ghent, Belgium, Mar. 17-20, 2002.
Vandegrift, G.F. et al. "Production of Mo-99 from LEU Targets Base-side Processing," Meeting on Reduced Enrichment for Research and Test Reactors, Las Vegas, Nevada, (Oct. 1-6 2000).
Von Hippel, F.N. et al., "Feasibility of Eliminating the Use of Highly Enriched Uranium in the Production of Medical Radioisotopes," Science and Global Security, 14:151-162 (2006).
Vucina, J. L. "Elution Efficiency of Mo-99/Tc-99m Generators," Facta Universitatis—Series: Physics, Chemistry and Technology, 2:3:125-130 (2001).
Weidner, J.W. et al. "Production of 13N via Inertial Electrostatic Confinement Fusion," Fusion Science and Technology 44: 539 (2003).
William, B. et al., "Proliferation Dangers Associated with Nuclear Medicine: Getting Weapons-Grade Uranium Out of Radiopharmaceutical Production," Medicine, Conflict and Survival, 23:4:267-281 (Dec. 2007).
Zabetakis, M.G., "Flammability Characteristics of Combustible Gases and Vapors," Bulletin 627, US Bureau of Mines (1965).
Ziegler, J. "Stopping and Range of Ions in Matter," www.srim.org (2008) Accessed (Jun. 1, 2010).

Bussard, R.W. "Some Physics Considerations of Magnetic Inertial-Electrostatic Confinement: A New Concept for Spherical Converging-flow Fusion," Fusion Technology 19: 273 (1991).
Collins, K.E. et al., "Extraction of High Specific Activity Radionuclides from Reactor-Irradiated [alpha]-Phthalocyanine Targets," Radiochem. Radioanalyt. Lett. 41: 129-132 (1979).
DeJesus, O.T. et al., "Production and Purification of Zr-89, a Potential PET Antibody Label," Appl. Radiat. Isotopes., Int.J. Radiat. Appl. Instr. Part A, 41:789-790 (1990).
Galy, J. et al., "A Neutron Booster for Spallation Sources-Application to Accelerator driven Systems and Isotope Production," Nuc. Instr. & Methods in Physics Res., 485:3:739-752 (2002).
Hirsch, R. L. "Inertial-Electrostatic Confinement of Ionized Fusion Gases" J. App. Phys. 38:4522-4534 (1967).
Kulcinski, G. L., "Non-electric power, near term applications of fusion energy" $18^{th}$ Symposium on Fusion Engineering, Albuquerque, NM, USA (1999) 5-8.
Lone, M.A., "Syrup Neutron Cross Sect. 10-40 JV1eV. Rep.:" BNL-NCS-50681, pp. 79-116 (1977).
Olhoett, G., "Applications and Frustrations in Using Ground Penetrating Radar," Aerospace and Electronics Systems Magazine, IEEE, 21:2:.12-20, (2002).
Radel et al., "Detection of Highly Enriched Uranium Using a Pulsed D-D Fusion Source," Fusion Science and Technology, vol. 52. No. 4, pp. 1087-1091 (2007).
Russoto, R.L. et al., "Measurement of fuel ion temperatures in ICF implosions using current mode neutron time of flight detectors" Review of Scientific Instrumentation, 61:10:3125-3127 (1990).
Sabatier, J.M., "A Study on the Passive Detection of Clandestine Tunnels," 2008 IEEE Conference on Technologies for Homeland Security, pp. 353-358, (May 12-13, 2008).
Schiller et al., "Electron Beam Technology," Wiley-Interscience p. 59; Fig. F (XP002545103) (1982).
Stolarczyk, L.G., "Detection of Underground Tunnels with a Synchronized Electromagnetic Wave Gradiometer," AFRL-VS-HA-TR-2005-1066, ARFL Technical Report, (2005).
Yoshikawa, K., et al., "Research and development of landmine detection system by a compact fusion neutron source", 16th Topical Meeting on Fusion Energy, Madison, WI, USA, O-I-6.4 (2004) 1224-1228.
Chinese Office Action for Application No. 200980123452.6 dated Feb. 17, 2013 (12 pages—English Translation).
Japanese Office Action for Application No. 2011/507694 dated Jun. 4, 2013 (Translation and Original, 9 pages).
PCT/US2011/23024 International Search Report and Written Opinion dated Dec. 6, 2011 (14 pages).
International Search Report and Written Opinion for Application No. PCT/US2013/031837 dated Dec. 6, 2013 (9 pages).
PCT/US2008/088485 International Search Report and Written Opinion dated Dec. 18, 2009 (14 pages).
PCT/US2009/042587 International Preliminary Report on Patentability dated Nov. 11, 2010 (9 pages).
PCT/US2009/042587 International Search Report and Written Opinion dated Dec. 16, 2009 (9 pages).
Piefer et al., "Mo-99 Production Using a Subcritical Assembly,"—Mo-99 2011—1st Annual Molybdenum-99 Topical Meeting, Dec. 2011 <https://mo99.ne.anl.gov/2011/pdfs/Mo99%202011%20Web%20Papers/S6-P3_Piefer-Paper.pdf> 7 pages.
Canadian Patent Office Action for Application No. 2,869,559 dated Nov. 6, 2020 (4 pages).
United States Patent Office Action for U.S. Appl. No. 15/6.44,497 dated Sep. 21, 2020 (14 pages).
Chinese Office Action for Application No. 200980123452.6 dated Feb. 11, 2014 (16 pages, English Translation included).
United States Patent Office Action for U.S. Appl. No. 14/390,658 dated Dec. 7, 2020 (13 pages).

\* cited by examiner

SEGMENTED REACTION CHAMBER FOR RADIOISOTOPE PRODUCTION

CROSS-REFERENCE TO RELATED APPLICATIONS

This application is a national stage filing under 35 U.S.C. 371 of International Application No. PCT/US2011/023024, filed Jan. 28, 2011, which claims priority to U.S. Provisional Patent Application No. 61/299,258, filed Jan. 28, 2010, and are incorporated herein by reference in their entireties.

BACKGROUND

The invention relates to a device and method for producing isotopes. More particularly, the invention relates to a device and method for producing neutron generated medical isotopes with or without a sub-critical reactor and low enriched uranium (LEU).

Radioisotopes are commonly used by doctors in nuclear medicine. The most commonly used of these isotopes is Mo-99. Much of the supply of Mo-99 is developed from highly enriched uranium (HEU). The HEU employed is sufficiently enriched to make nuclear weapons. HEU is exported from the United States to facilitate the production of the needed Mo-99. It is desirable to produce the needed Mo-99 without the use of HEU.

SUMMARY

In certain embodiments, provided is a reactor operable to produce an isotope, the reactor comprising a region for containing a controlled nuclear fission reaction, the region segmented into a plurality of independent compartments, each of the compartments for containing a parent material in an aqueous solution that interacts with neutrons to produce the isotope via a fission reaction. The region may be segmented into n independent compartments, wherein n is an integer greater than or equal to 2.

In other embodiments, provided is a reactor operable to produce an isotope, the reactor comprising a fusion portion including a target path disposed within a target chamber that substantially encircles a space, the fusion portion operable to produce a neutron flux within the target chamber; and a fission portion for containing a controlled nuclear fission reaction, the fission portion segmented into a plurality of independent compartments and positioned within the space for containing a parent material in an aqueous solution that reacts with a portion of the neutron flux to produce the isotope during a fission reaction.

In other embodiments, provided is a method of producing an isotope, the method comprising: positioning a parent material in an aqueous solution within a region for containing a controlled nuclear reaction, the region segmented into a plurality of independent compartments; reacting, in at least one of the compartments over a time period y, neutrons with the parent material to produce the isotope; and extracting the aqueous solution comprising the isotope from the compartment.

Other aspects and embodiments of the invention will become apparent by consideration of the detailed description and accompanying drawings.

BRIEF DESCRIPTION OF THE DRAWINGS

The invention may be better understood and appreciated by reference to the detailed description of specific embodiments presented herein in conjunction with the accompanying drawings of which.

DETAILED DESCRIPTION

Segmented Reaction Chamber

Figure 1:
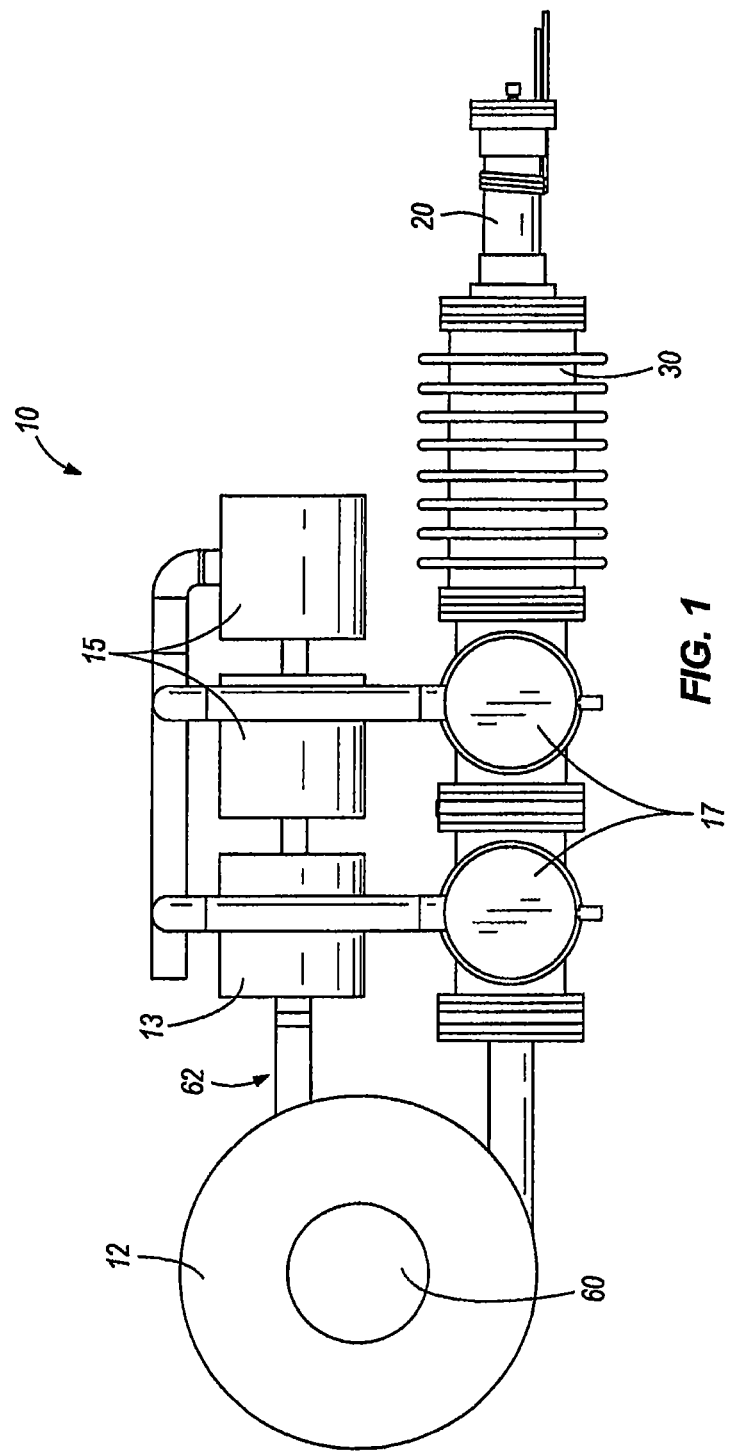
FIG. 1 is a first view of the generator with magnetic target chamber.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

Before explaining at least one embodiment, it is to be understood that the invention is not limited in its application to the details set forth in the following description as exemplified by the Examples. Such description and Examples are not intended to limit the scope of the invention as set forth in the appended claims. The invention is capable of other embodiments or of being practiced or carried out in various ways.

Throughout this disclosure, various aspects of this invention may be presented in a range format. It should be understood that the description in range format is merely for convenience and brevity, and should not be construed as an inflexible limitation on the scope of the invention. Accordingly, as will be understood by one skilled in the art, for any and all purposes, particularly in terms of providing a written description, all ranges disclosed herein also encompass any and all possible subranges and combinations of subranges thereof, as well as all integral and fractional numerical values within that range. As only one example, a range of 20% to 40% can be broken down into ranges of 20% to 32.5% and 32.5% to 40%, 20% to 27.5% and 27.5% to 40%, etc. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third, and upper third, etc. Further, as will also be understood by one skilled in the art, all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio. These are only examples of what is specifically intended. Further, the phrases "ranging/ranges between" a first indicate number and a second indicate number and "ranging/ranges from" a first indicate number "to" a second indicate number are used herein interchangeably.

Terms such as "substantially," "about," "approximately" and the like are used herein to describe features and characteristics that can deviate from an ideal or described condition without having a significant impact on the performance of the device. For example, "substantially parallel" could be used to describe features that are desirably parallel but that could deviate by an angle of up to 20 degrees so long as the deviation does not have a significant adverse effect on the device. Similarly, "substantially linear" could include a slightly curved path or a path that winds slightly so long as the deviation from linearity does not significantly adversely effect the performance of the device.

Provided is a segmented reaction chamber for a reactor operable to produce an isotope. The reactor may comprise a region for containing a controlled nuclear fission reaction, the region segmented into a plurality of independent compartments. Each of the compartments may contain a parent material in an aqueous solution. The parent material may interact with neutrons to produce an isotope via a fission reaction. The isotope produced may comprise at least one of the isotopes including, but not limited to, Mo-99, I-131, I-125, Xe-133, Cs-137, Co-60, Y-90, Sr-90, and Sr-89.

In certain embodiments, a reaction chamber 405 comprises an activation cell 410 that may be segmented, forming a segmented activation cell 600, as shown in FIGS. 32-35. It is envisioned that the principles of a segmented approach for a subcritical reactor for isotope production is also applicable to any aqueous reactor system.

In certain embodiments, the invention provides an aqueous reaction chamber (ARC), filled with an aqueous solution, such as one found in a critical or subcritical aqueous isotope production system. The activation cell may be segmented into multiple pieces or a plurality of compartments by dividers 605. The segmented activation cell 600 may be divided or segmented into n independent compartments by dividers 605. The independent compartments n may be any integer from 2 to 10, from 3 to 8, or from 4 to 6. The compartments may be assembled or positioned proximate to the target chamber in any suitable orientation. For example, the compartments may be radially symmetrically disposed about a central axis of the activation cell. In certain embodiments, the compartments may be disposed linearly along a central axis, disposed concentrically about a central axis, or disposed radially asymmetrically about a central axis of the activation cell. The compartments of the activation cell may independently contain a parent material for interacting with the protons or neutrons generated in the target chamber to produce an isotope. 1-3 solution extraction/fill lines 610 may connect each chamber to an exterior reservoir (not shown) to transport parent material and isotope. A plurality of water cooling pipes 615 may flow fluid to supply a cooling jacket 620 proximal to or surrounding the segmented activation cell 600. A lid 625 may cap the segmented activation cell 600 to retain the fluid materials within.

A segmented activation cell may allow for the extraction of isotopes at different periods of time. Separations in the reaction region may also be used to control instabilities that might develop in the solution. In some embodiments, the parent material in at least one compartment may be reacted over a time period y with at least a portion of the neutrons or protons generated in the target chamber. The time period y may be about the half life of the isotope produced. For example, the half life of Mo-99 is about 66 h. As such, the time period y may be about 60 h to about 70 h. The time period y may be at least about at least about 12 h, at least about 18 h, 24 h, at least about 36 h, at least about 48 h, at least about 72 h, or at least about 96 h. The time period y may be less than about 2 weeks, less than about 1.5 weeks, less than about 1 week, less than about 5 days, less than about 100 h, less than about 96 h, less than about 72 h, or less than about 48 h. The time period y may be about 12 h to about 2 weeks, about 24 h to about 1 week, about 36 h to about 96 h, or about 48 h to about 80 h.

Existing systems describing the production of medical isotopes in ARCs may utilize a single volume to contain the aqueous solution. In such systems, the ARC may be operated from periods of minutes to months to produce various isotopes. When the device has operated for sufficient time to produce the desired quantity of an isotope, the fluid may be drained and the isotope separated. Suitably, optimal production will have occurred after a period of time equal to approximately one half-life of the material being created.

Many markets for radioisotopes require a continuous supply of material; oversupply may not be sold and undersupply may result in lost revenue. If an oversupply is generated early in a period of time and cannot be sold, it may decay away in storage. In order to supply constant market demand, an excess of material may be produced early in the cycle, so that there may be ample supply while waiting for the next batch.

Figure 30:
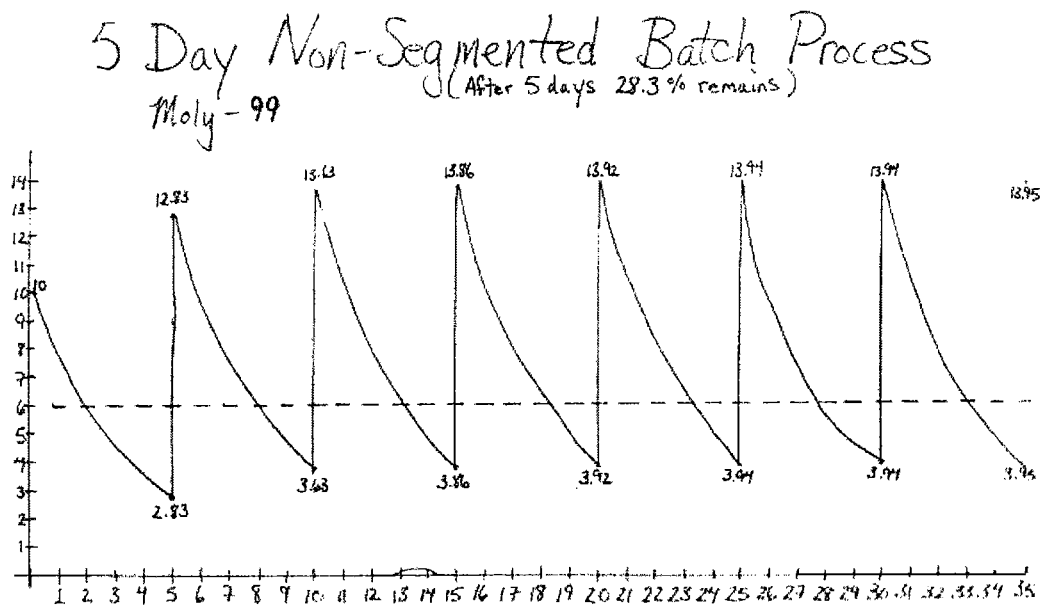
FIG. 30 illustrates the decay of a particularly useful isotope, Mo-99 as created in a 5 day batch process.

FIG. 30 illustrates the decay of a particularly useful isotope, Mo-99 as created in a 5 day batch process. The dashed line represents hypothetical demand (x-axis reads days, y axis reads supply units). In this system, it may take 5 days to produce 10 units of Mo-99. Once the isotope is extracted, irradiation may start on the next 5 day batch. This may result in a tremendous variation in the amount of material available. Due to requirements for high purity isotopes, the ARC may irradiate its solution to near saturation, so shorter batches may not be performed to distribute the production of isotopes over time.

In other embodiments, the ARC may be cut into physically different sections within the same device. If a device has x regions in it, the entire system could be irradiated to saturation (which occurs at time y), and then one cell may have its isotopes extracted after a period of time proportional to the saturation time. Then, every period of time that passes equal to y/x, another cell may have its isotopes extracted. As soon as isotope extraction is performed on any given cell, the irradiation process on that cell may begin anew. As such, each cell may always be irradiated to nearly saturation before it is empty.

Figure 31:
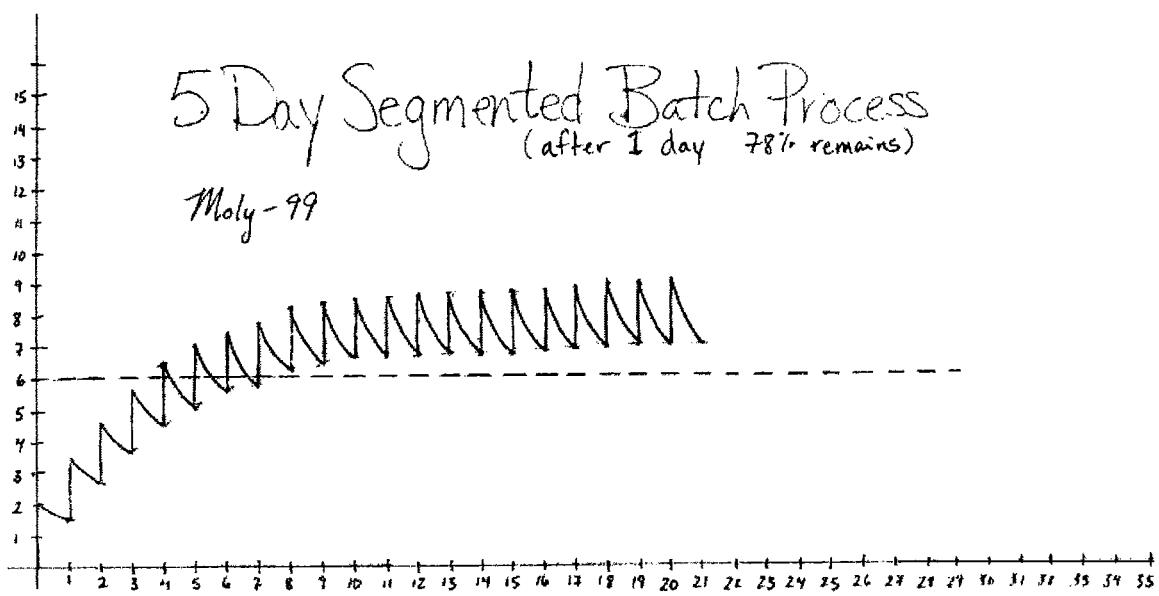
FIG. 31 shows the amount of Mo-99 available during a 5 day batch process with a segmented reaction chamber in arbitrary units.
Figure 32:
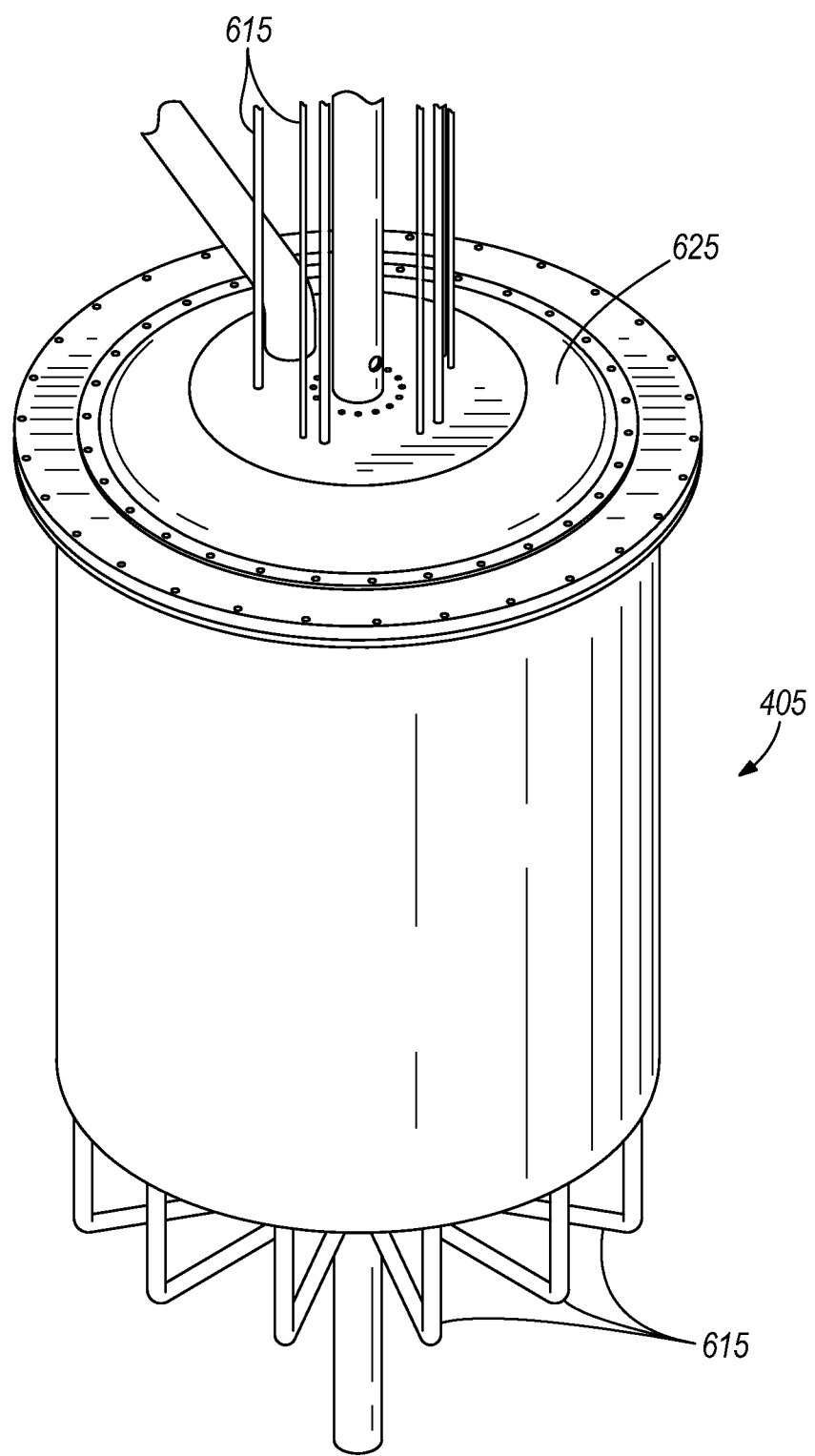
FIG. 32 is a perspective view of a segmented reaction chamber or activation cell.
Figure 33:
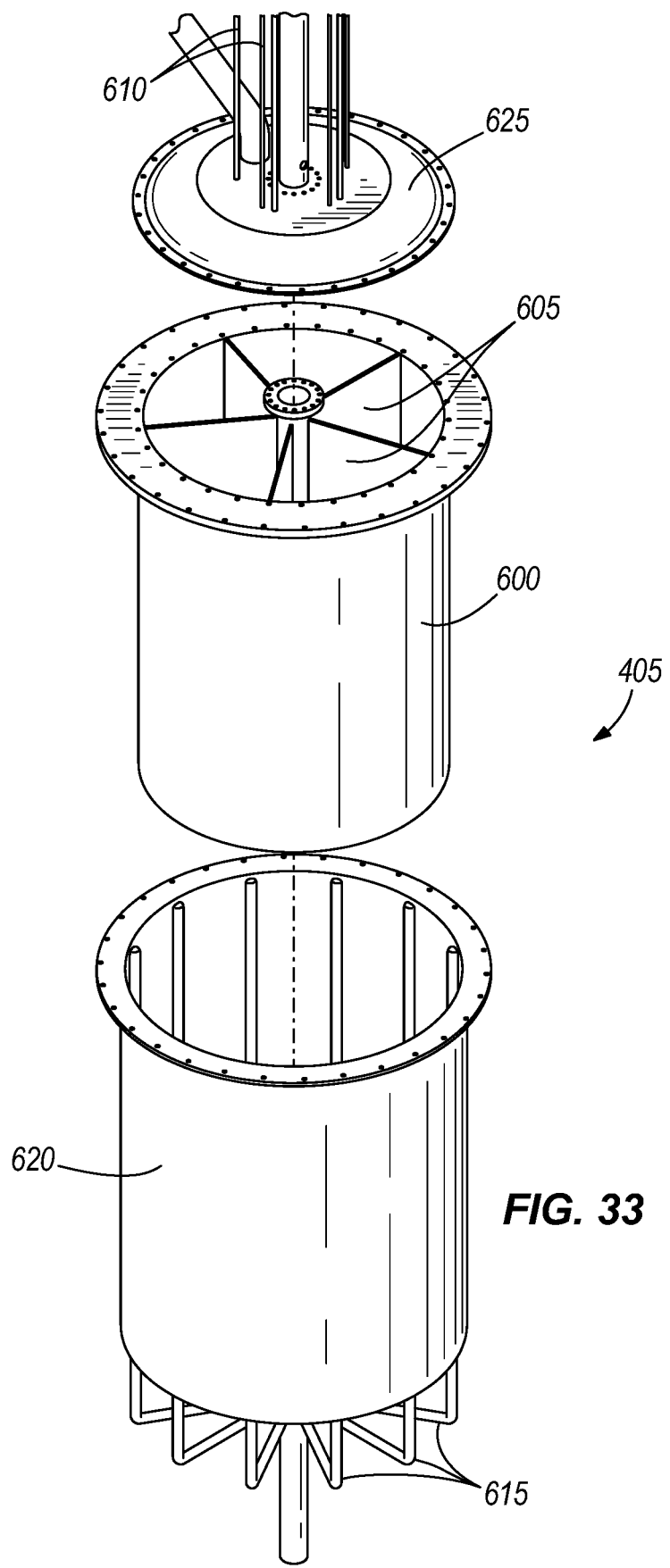
FIG. 33 is an exploded view of a segmented reaction chamber or activation cell.
Figure 34:
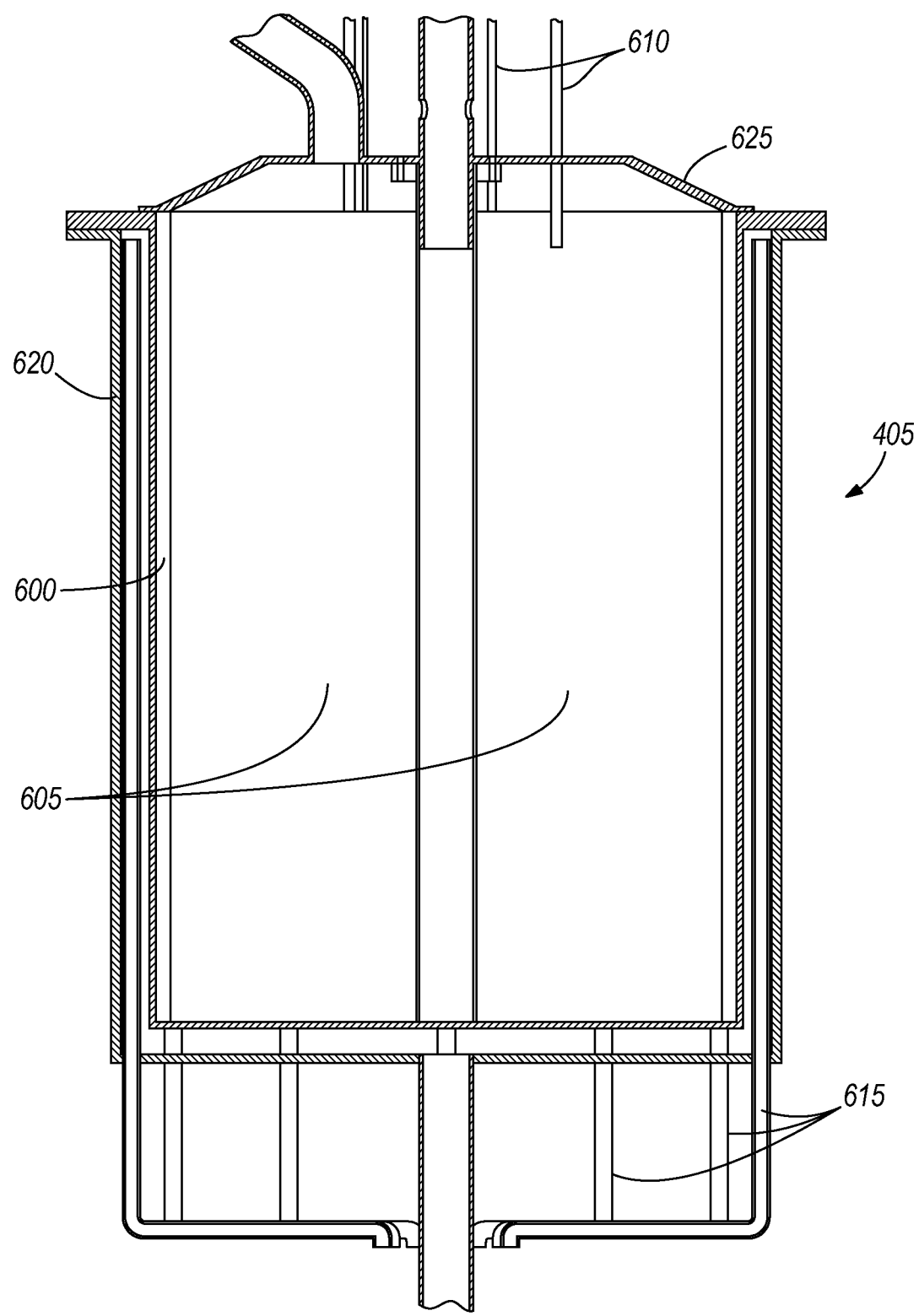
FIG. 34 is a side cross section view of a segmented reaction chamber or activation cell.
Figure 35:
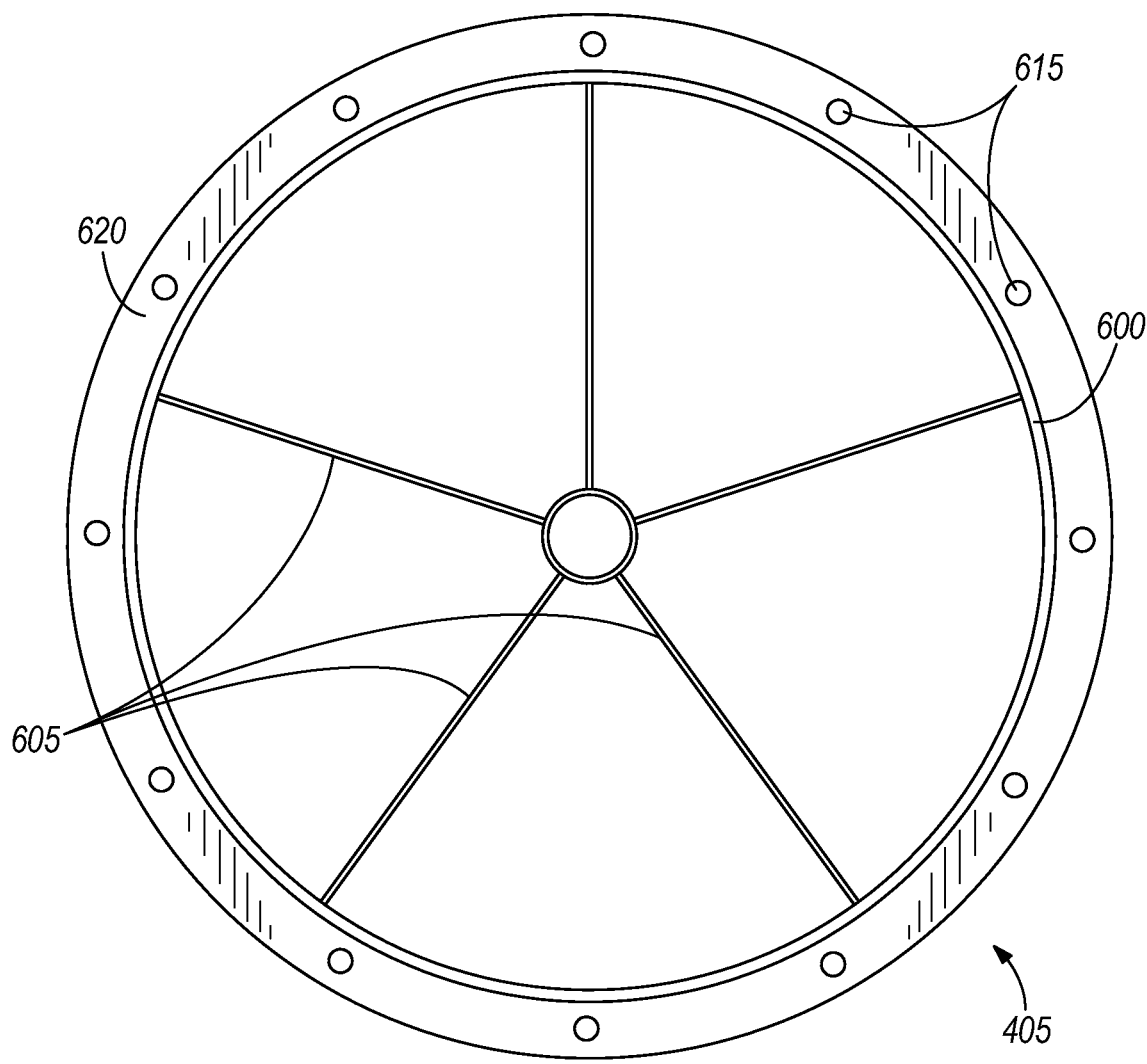
FIG. 35 is a top cross section view of a segmented reaction chamber or activation cell.

Again, considering the case of Mo-99, it may be desirable to have approximately a 5 day irradiation period. In this case, the ARC may be split into 5 cells. Every day in the 5 day period, 2 units of Mo-99 may be extracted. This may lead to a more uniform supply of the radioisotope, as shown in FIG. 31. FIG. 31 shows the amount of Mo-99 available during a 5 day batch process with a segmented reaction chamber in arbitrary units. The dashed line represents hypothetical demand (x-axis reads days, y axis reads supply units).

In FIG. 30, shown is the hypothetical ARC described may create an oversupply early in the 5 day period, and may not be able to meet demand later. As shown in FIG. 31, the same ARC, segmented into 5 pieces, may continuously meet demand, which may result in less wasted product and eliminate the shortage previously experienced.

A similar effect may be created by producing multiple smaller units, but there may be significantly greater expense involved in doing so. The segmented design may offer almost no additional cost, but may improve performance dramatically.

In addition to the utility for smoothing supply to meet demand, the segmented aqueous system may serve to disrupt instabilities that may arise in critical or near critical aqueous systems. These instabilities may lead to control problems that may result in a failure to properly operate. Previous experiments with critical aqueous reactors resulted in instabilities that led to control problems as well as destructive behaviors that caused radiological spills. These instabilities were the result of the solution moving around in unpredictable ways, in some cases forming vortices in the solution.

The addition of segmentation to the reaction chamber may minimize the extent to which these instabilities can propagate, which may greatly increase the controllability of the reaction chamber.

A segmented reaction chamber may be used with any suitable critical or subcritical fission reactor with an aqueous reaction chamber. For example, a segmented reaction chamber may be used with a hybrid reactor described below.

Example of a Hybrid Reactor for Production of Isotopes

Figure 22:
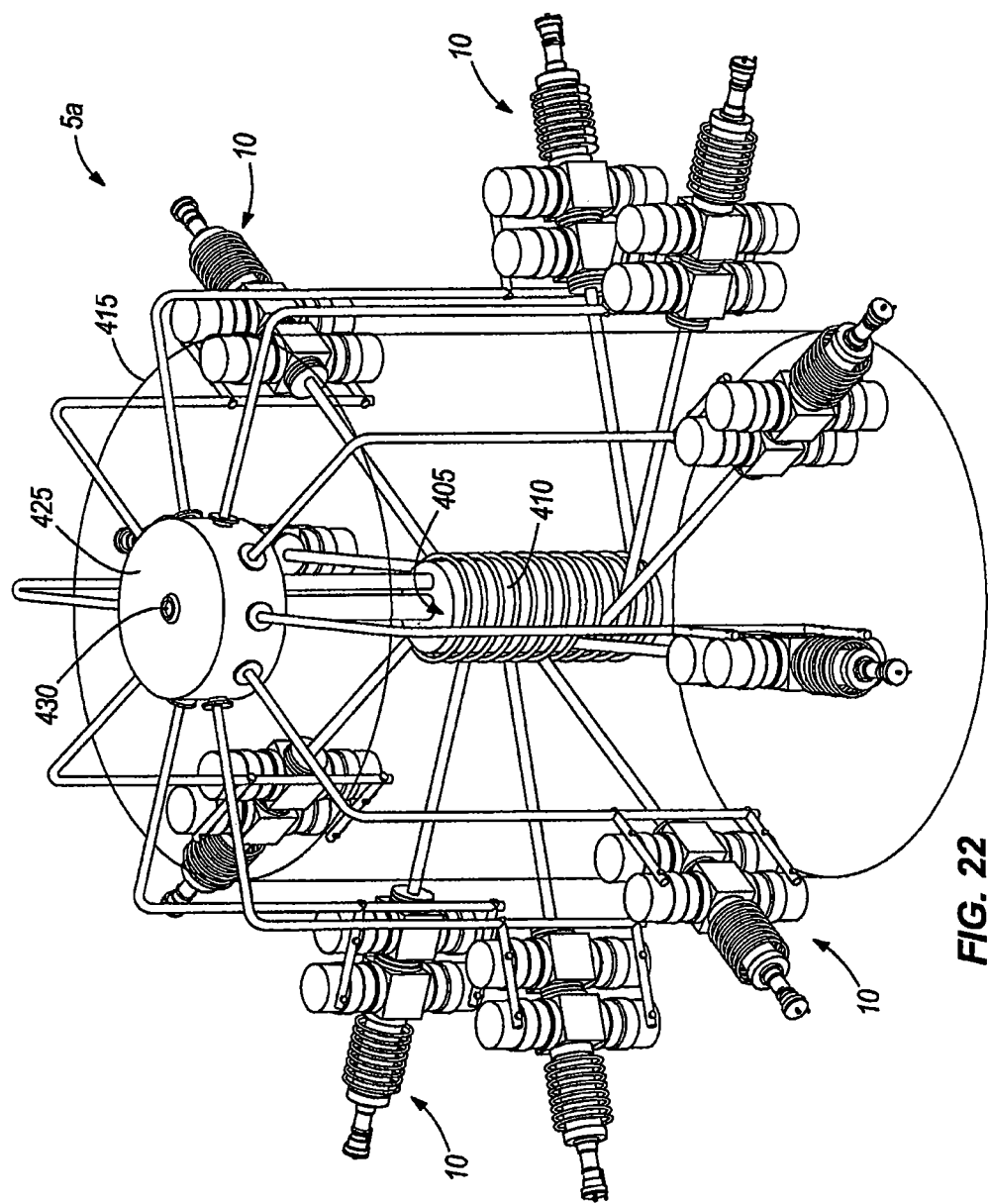
FIG. 22 is a perspective view of a hybrid reactor including a fusion portion and a fission portion suited to the production of medical isotopes.

FIG. 22 illustrates an arrangement of a hybrid reactor 5a that is well suited to the production of medical isotopes. Before proceeding, the term "hybrid reactor" as used herein is meant to describe a reactor that includes a fusion portion and a fission portion. In particular, the illustrated reactor 5a is well suited to the production of Mo-99 from Mo-98 or from a solution of LEU. The hybrid reactor 5a includes a fusion portion 10 and a fission portion 8 that cooperate to produce the desired isotopes. In the construction illustrated in FIG. 22, ten distinct fusion portions 10 are employed. Each fusion portion 10 is arranged as a magnetic fusion portion 10 and acts as a neutron source as will be discussed with regard to FIGS. 1 and 2. Of course other arrangements could use fewer fusion portions 10, more fusion portions 10, or other arrangements of fusion portions as desired.

Figure 23:
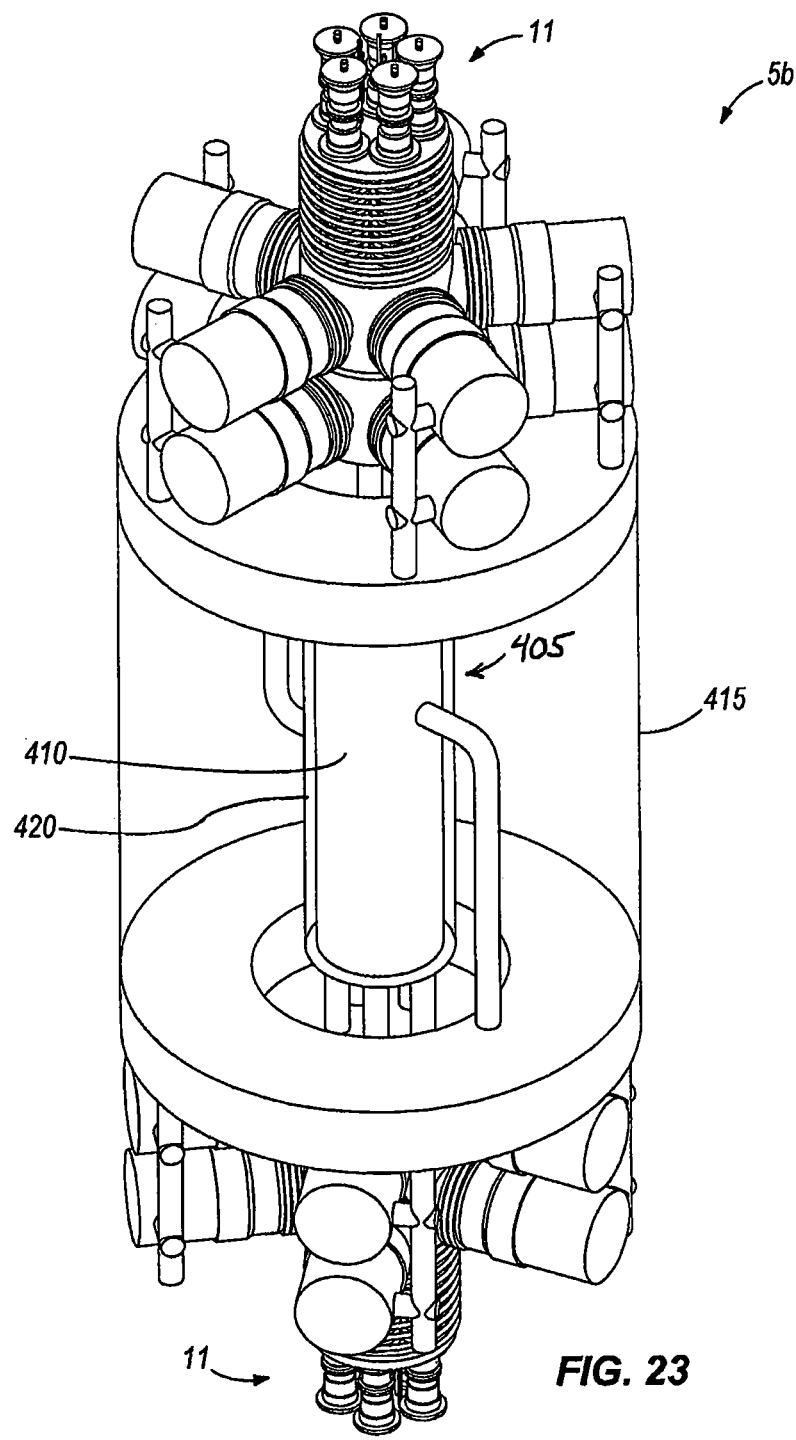
FIG. 23 is a perspective view of another arrangement of a hybrid reactor including a fusion portion and a fission portion suited to the production of medical isotopes.

FIG. 23 illustrates another arrangement of a hybrid reactor 5b that is well suited to the production of medical isotopes. In the construction of FIG. 23, linear fusion portions 11 act as neutron sources as will be discussed with regard to FIGS. 3 and 4. In the construction of FIG. 23, the linear fusion portions 11 are arranged such that five fusion portions 11 are positioned at one end of the fission portion 8 and five fusion portions 11 are positioned on the opposite end of the fission portion 8. Of course other arrangements that employ other quantities of fusion portions 11, or other arrangements of fusion portions could be employed if desired.

Figure 2:
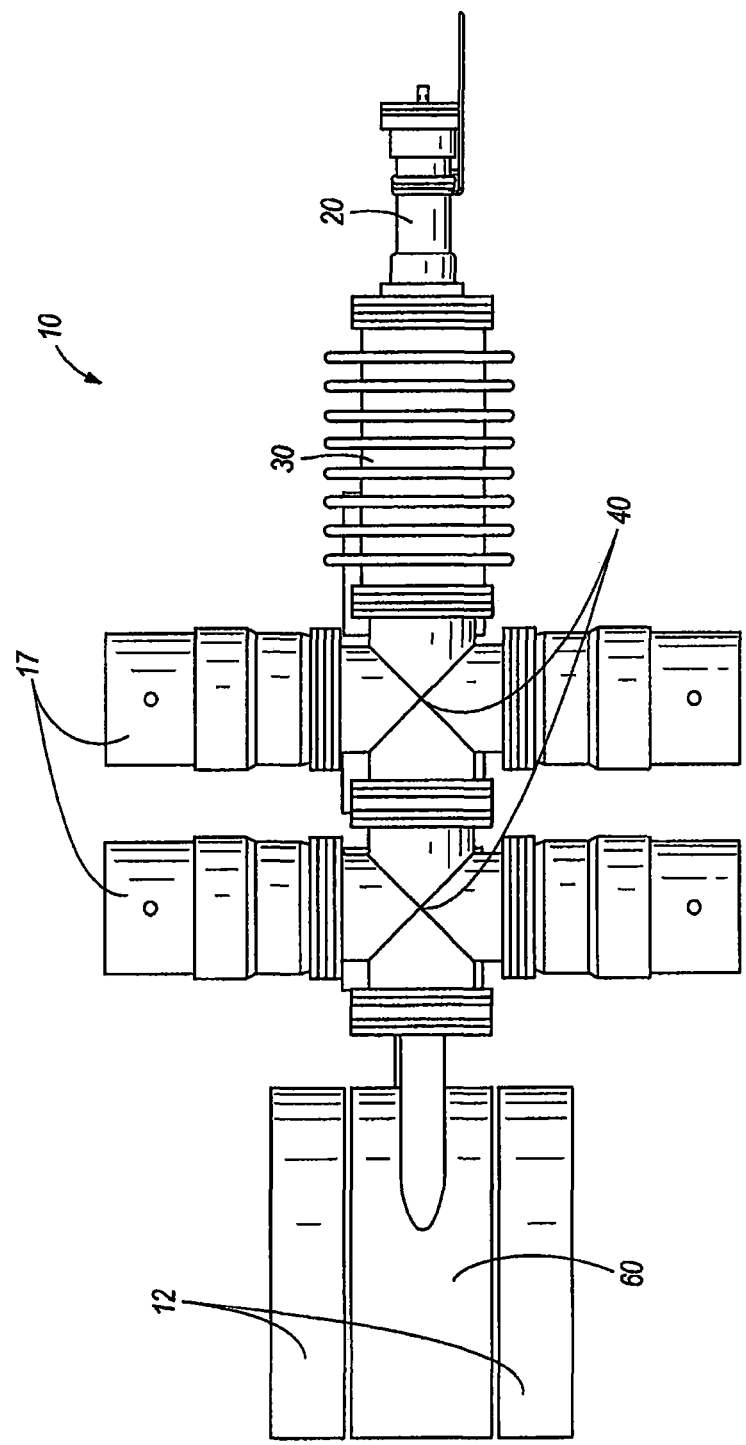
FIG. 2 is a second view of the generator with magnetic target chamber.
Figure 3:
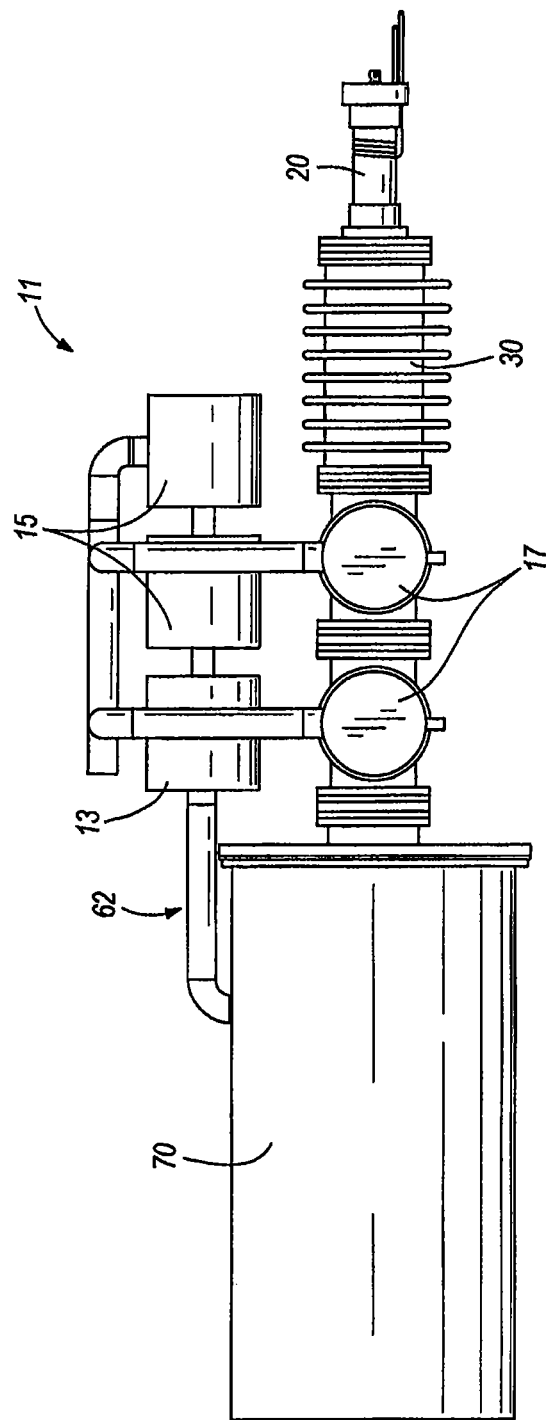
FIG. 3 is a first view of the generator with linear target chamber.
Figure 4:
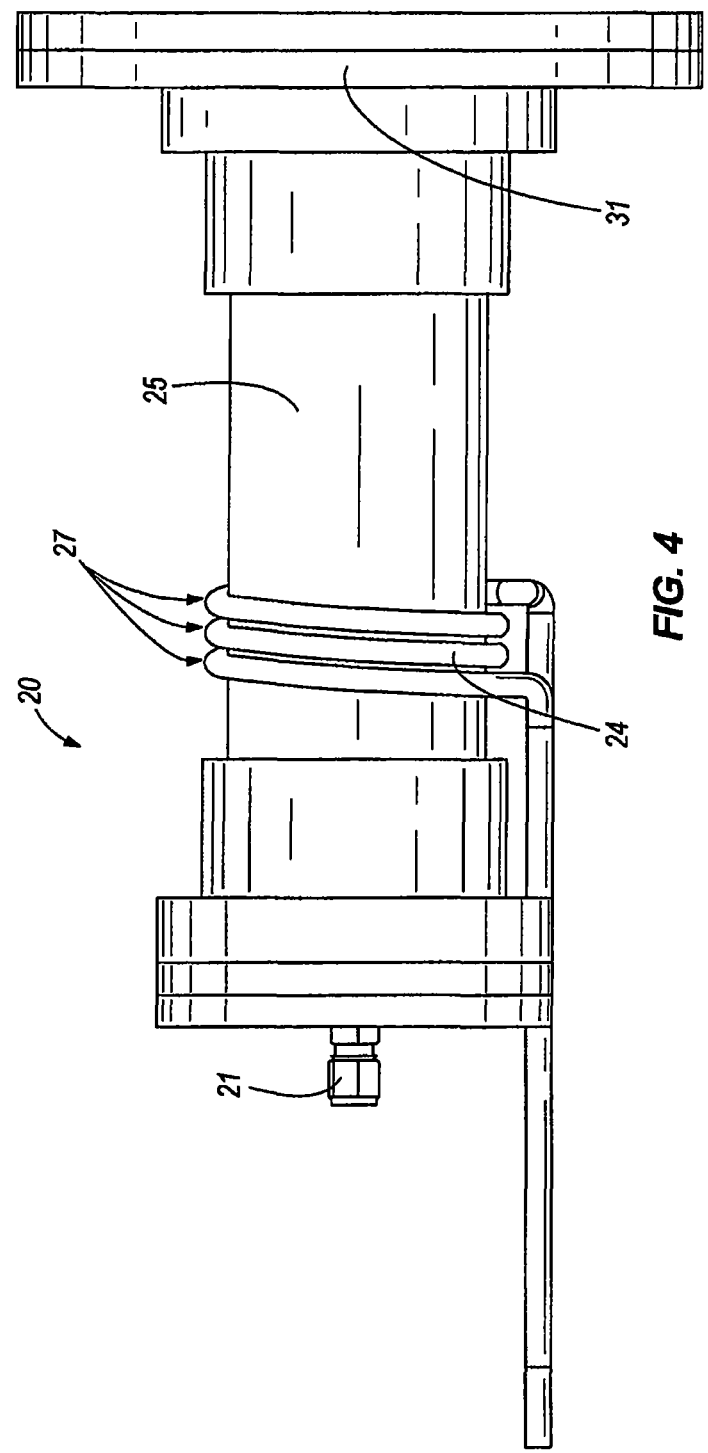
FIG. 4 is a first view of the ion source.

As illustrated in FIGS. 1-3, each fusion portion 10, 11 provides a compact device that may function as a high energy proton source or a neutron source. In one embodiment, the fusion portions 10, 11 utilize $^2$H-$^3$He (deuterium-helium 3) fusion reactions to generate protons, which may then be used to generate other isotopes. In another embodiment, the fusion portions 10, 11 function as neutron sources by changing the base reactions to $^2$H-$^3$H, $^2$H-$^2$H, or $^3$H-$^3$H reactions.

In view of the disadvantages inherent in the conventional types of proton or neutron sources, the fusion portions 10, 11 provide a novel high energy proton or neutron source (sometimes referred to herein generically as an ion source but also considered a particle source) that may be utilized for the production of medical isotopes. Each fusion portion 10, 11 uses a small amount of energy to create a fusion reaction, which then creates higher energy protons or neutrons that may be used for isotope production. Using a small amount of energy may allow the device to be more compact than previous conventional devices.

Each fusion portion 10, 11 suitably generates protons that may be used to generate other isotopes including but not limited to $^{18}$F, $^{11}$C, $^{15}$O, $^{13}$N, $^{63}$Zn, $^{124}$I and many others. By changing fuel types, each fusion portion may also be used to generate high fluxes of neutrons that may be used to generate isotopes including but not limited to I-131, Xe-133, In-111, I-125, Mo-99 (which decays to Tc-99m) and many others. As such, each fusion portion 10, 11 provides a novel compact high energy proton or neutron source for uses such as medical isotope generation that has many of the advantages over the proton or neutron sources mentioned heretofore.

In general, each fusion portion 10, 11 provides an apparatus for generating protons or neutrons, which, in turn, are suitably used to generate a variety of radionuclides (or radioisotopes). With reference to FIGS. 1 and 2, each magnetic fusion portion 10 includes a plasma ion source 20, which may suitably include an RF-driven ion generator and/or antenna 24, an accelerator 30, which is suitably electrode-driven, and a target system including a target chamber 60. In the case of proton-based radioisotope production, the apparatus may also include an isotope extraction system 90. The RF-driven plasma ion source 20 generates and collimates an ion beam directed along a predetermined pathway, wherein the ion source 20 includes an inlet for entry of a first fluid. The electrode-driven accelerator 30 receives the ion beam and accelerates the ion beam to yield an accelerated ion beam. The target system receives the accelerated ion beam. The target system contains a nuclear particle-deriving, e.g. a proton-deriving or neutron-deriving, target material that is reactive with the accelerated beam and that, in turn, emits nuclear particles, i.e., protons or neutrons. For radioisotope production, the target system may have sidewalls that are transparent to the nuclear particles. An isotope extraction system 90 is disposed proximate or inside the target system and contains an isotope-deriving material that is reactive to the nuclear particles to yield a radionuclide (or radioisotope).

It should be noted that while an RF-driven ion generator or ion source is described herein, other systems and devices are also well-suited to generating the desired ions. For example, other constructions could employ a DC arc source in place of or in conjunction with the RF-driven ion generator or ion source. Still other constructions could use hot cathode ion sources, cold cathode ion sources, laser ion sources, field emission sources, and/or field evaporation sources in place of or in conjunction with a DC arc source and or an RF-driven ion generator or ion source. As such, the invention should not be limited to constructions that employ an RF-driven ion generator or ion source.

As discussed, the fusion portion can be arranged in a magnetic configuration 10 and/or a linear configuration 11. The six major sections or components of the device are connected as shown in FIG. 1 and FIG. 2 for the magnetic configuration 10, and FIG. 3 for the linear configuration 11. Each fusion portion, whether arranged in the magnetic arrangement or the linear arrangement includes an ion source generally designated 20, an accelerator 30, a differential pumping system 40, a target system which includes a target chamber 60 for the magnetic configuration 10 or a target chamber 70 for the linear configuration 11, an ion confinement system generally designated 80, and an isotope extraction system generally designated 90. Each fusion portion may additionally include a gas filtration system 50. Each fusion portion may also include a synchronized high speed pump 100 in place of or in addition to the differential pumping system 40. Pump 100 is especially operative with the linear configuration of the target chamber.

Figure 5:
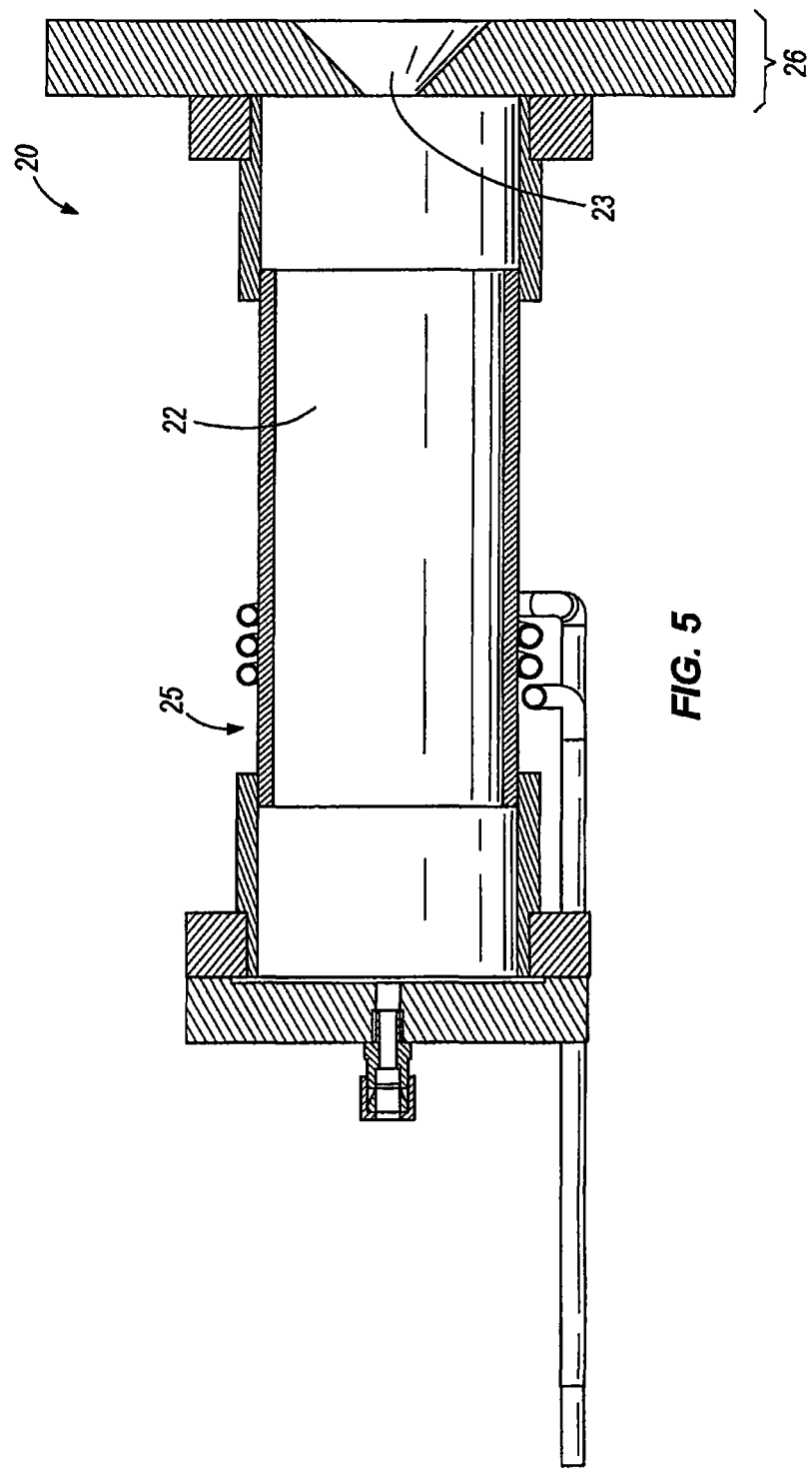
FIG. 5 is a sectional view of the ion source.
Figure 6:
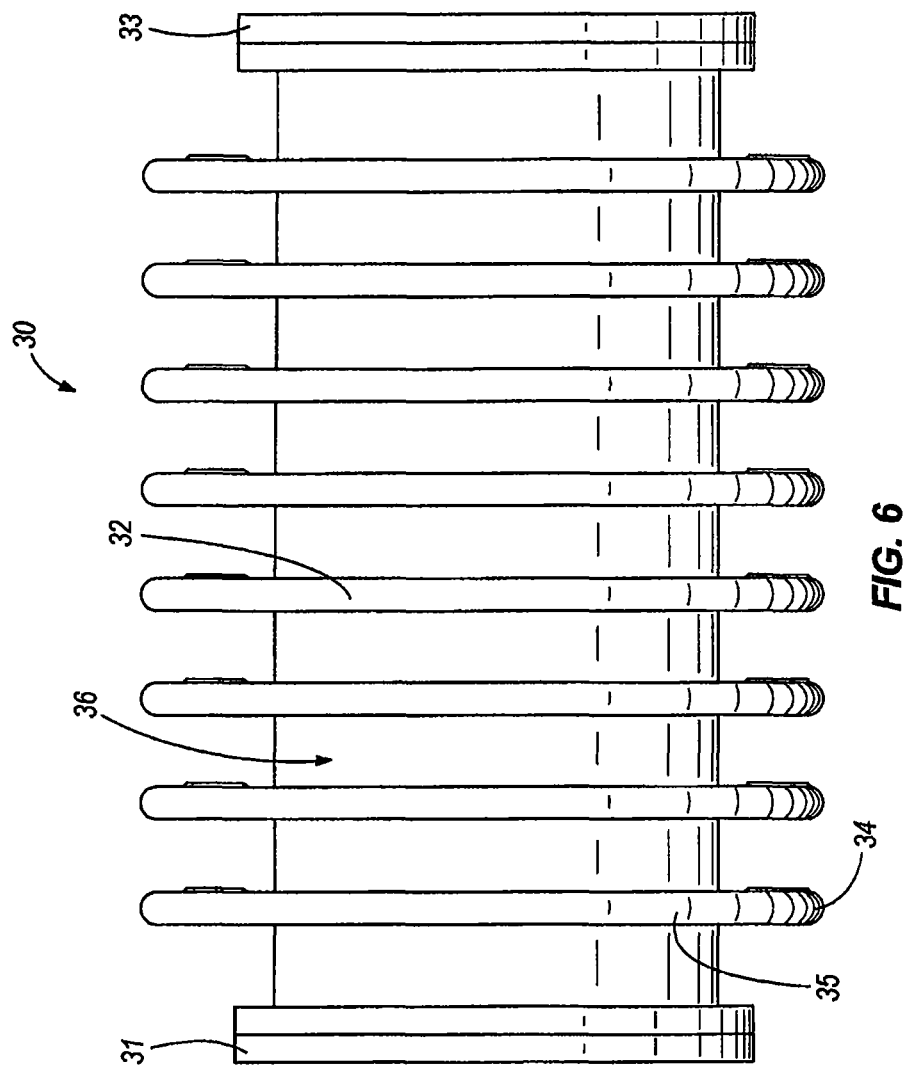
FIG. 6 is a first view of the accelerator.

The ion source 20 (FIG. 4 and FIG. 5) includes a vacuum chamber 25, a radio-frequency (RF) antenna 24, and an ion injector 26 having an ion injector first stage 23 and an ion injector final stage 35 (FIG. 6). A magnet (not shown) may be included to allow the ion source to operate in a high density helicon mode to create higher density plasma 22 to yield more ion current. The field strength of this magnet suitably ranges from about 50 G to about 6000 G, suitably about 100 G to about 5000 G. The magnets may be oriented so as to create an axial field (north-south orientation parallel to the path of the ion beam) or a cusp field (north-south orientation perpendicular to the path of the ion beam with the inner pole alternating between north and south for adjacent magnets). An axial field can create a helicon mode (dense plasma), whereas a cusp field may generate a dense plasma but not a helicon inductive mode. A gas inlet 21 is located on one end of the vacuum chamber 25, and the first stage 23 of the ion injector 26 is on the other. Gas inlet 21 provides one of the desired fuel types, which may include $^1H_2$, $^2H_2$, $^3H_2$, $^3H_2$, $^3He$, and $^{11}B$, or may comprise $^1H$, $^3H$, $^3He$, and $^{11}B$. The gas flow at inlet 21 is suitably regulated by a mass flow controller (not shown), which may be user or automatically controlled. RF antenna 24 is suitably wrapped around the outside of vacuum chamber 25. Alternatively, RF antenna 24 may be inside vacuum chamber 25. Suitably, RF antenna 24 is proximate the vacuum chamber such that radio frequency radiation emitted by RF antenna 24 excites the contents (i.e., fuel gas) of vacuum chamber 25, for example, forming a plasma. RF antenna 24 includes a tube 27 of one or more turns. RF tube or wire 27 may be made of a conductive and bendable material such as copper, aluminum, or stainless steel.

Ion injector 26 includes one or more shaped stages (23, 35). Each stage of the ion injector includes an acceleration electrode 32 suitably made from conductive materials that may include metals and alloys to provide effective collimation of the ion beam. For example, the electrodes are suitably made from a conductive metal with a low sputtering coefficient, e.g., tungsten. Other suitable materials may include aluminum, steel, stainless steel, graphite, molybdenum, tantalum, and others. RF antenna 24 is connected at one end to the output of an RF impedance matching circuit (not shown) and at the other end to ground. The RF impedance matching circuit may tune the antenna to match the impedance required by the generator and establish an RF resonance. RF antenna 24 suitably generates a wide range of RF frequencies, including but not limited to 0 Hz to tens of kHz to tens of MHz to GHz and greater. RF antenna 24 may be water-cooled by an external water cooler (not shown) so that it can tolerate high power dissipation with a minimal change in resistance. The matching circuit in a turn of RF antenna 24 may be connected to an RF power generator (not shown). Ion source 20, the matching circuit, and the RF power generator may be floating (isolated from ground) at the highest accelerator potential or slightly higher, and this potential may be obtained by an electrical connection to a high voltage power supply. RF power generator may be remotely adjustable, so that the beam intensity may be controlled by the user, or alternatively, by computer system. RF antenna 24 connected to vacuum chamber 25 suitably positively ionizes the fuel, creating an ion beam. Alternative means for creating ions are known by those of skill in the art and may include microwave discharge, electron-impact ionization, and laser ionization.

Figure 7:
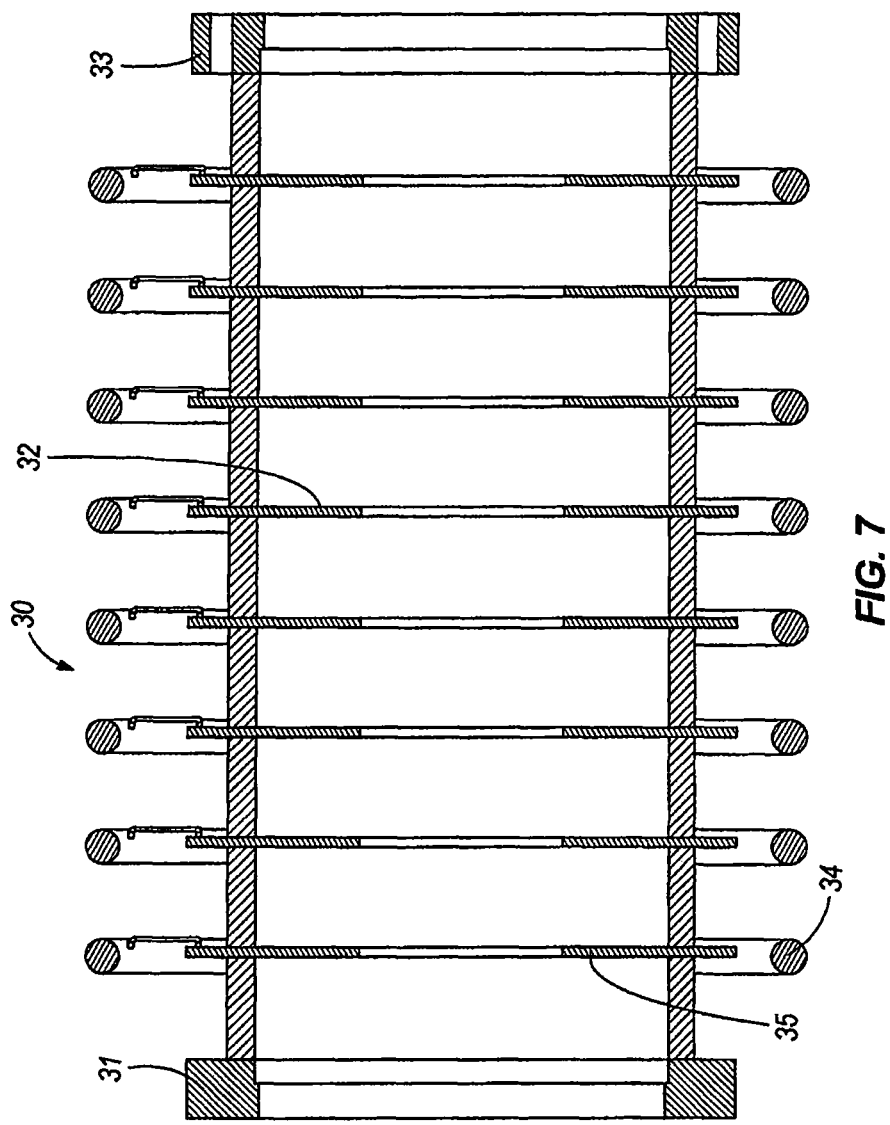
FIG. 7 is a sectional view of the accelerator.

Accelerator 30 (FIG. 6 and FIG. 7) suitably includes a vacuum chamber 36, connected at one end to ion source 20 via an ion source mating flange 31, and connected at the other end to differential pumping system 40 via a differential pumping mating flange 33. The first stage of the accelerator is also the final stage 35 of ion injector 26. At least one circular acceleration electrode 32, and suitably 3 to 50, more suitably 3 to 20, may be spaced along the axis of accelerator vacuum chamber 36 and penetrate accelerator vacuum chamber 36, while allowing for a vacuum boundary to be maintained. Acceleration electrodes 32 have holes through their centers (smaller than the bore of the accelerator chamber) and are suitably each centered on the longitudinal axis (from the ion source end to the differential pumping end) of the accelerator vacuum chamber for passage of the ion beam. The minimum diameter of the hole in acceleration electrode 32 increases with the strength of the ion beam or with multiple ion beams and may range from about 1 mm to about 20 cm in diameter, and suitably from about 1 mm to about 6 cm in diameter. Outside vacuum chamber 36, acceleration electrodes 32 may be connected to anti-corona rings 34 that decrease the electric field and minimize corona discharges. These rings may be immersed in a dielectric oil or an insulating dielectric gas such as $SF_6$. Suitably, a differential pumping mating flange 33, which facilitates connection to differential pumping section 40, is at the exit of the accelerator.

Each acceleration electrode 32 of accelerator 30 can be supplied bias either from high voltage power supplies (not shown), or from a resistive divider network (not shown) as is known by those of skill in the art. The divider for most cases may be the most suitable configuration due to its simplicity. In the configuration with a resistive divider network, the ion source end of the accelerator may be connected to the high voltage power supply, and the second to last accelerator electrode 32 may be connected to ground. The intermediate voltages of the accelerator electrodes 32 may be set by the resistive divider. The final stage of the accelerator is suitably biased negatively via the last acceleration electrode to prevent electrons from the target chamber from streaming back into accelerator 30.

In an alternate embodiment, a linac (for example, a RF quadrapole) may be used instead of an accelerator 30 as described above. A linac may have reduced efficiency and be larger in size compared to accelerator 30 described above. The linac may be connected to ion source 20 at a first end and connected to differential pumping system 40 at the other end. Linacs may use RF instead of direct current and high voltage to obtain high particle energies, and they may be constructed as is known in the art.

Figure 8:
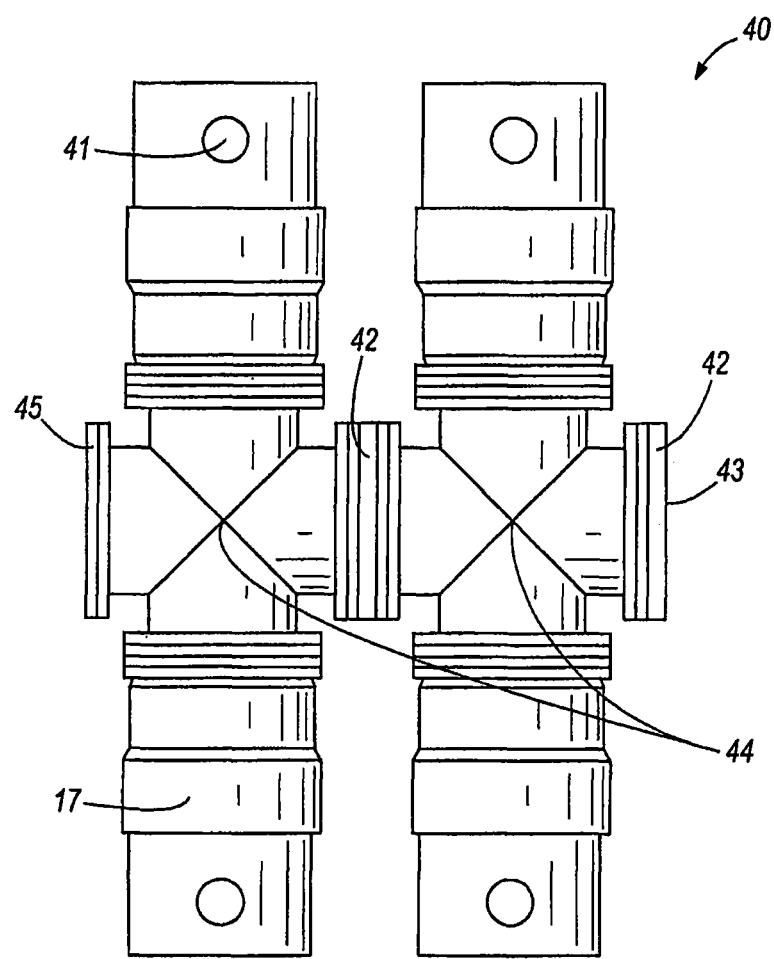
FIG. 8 is a first view of the differential pumping.
Figure 9:
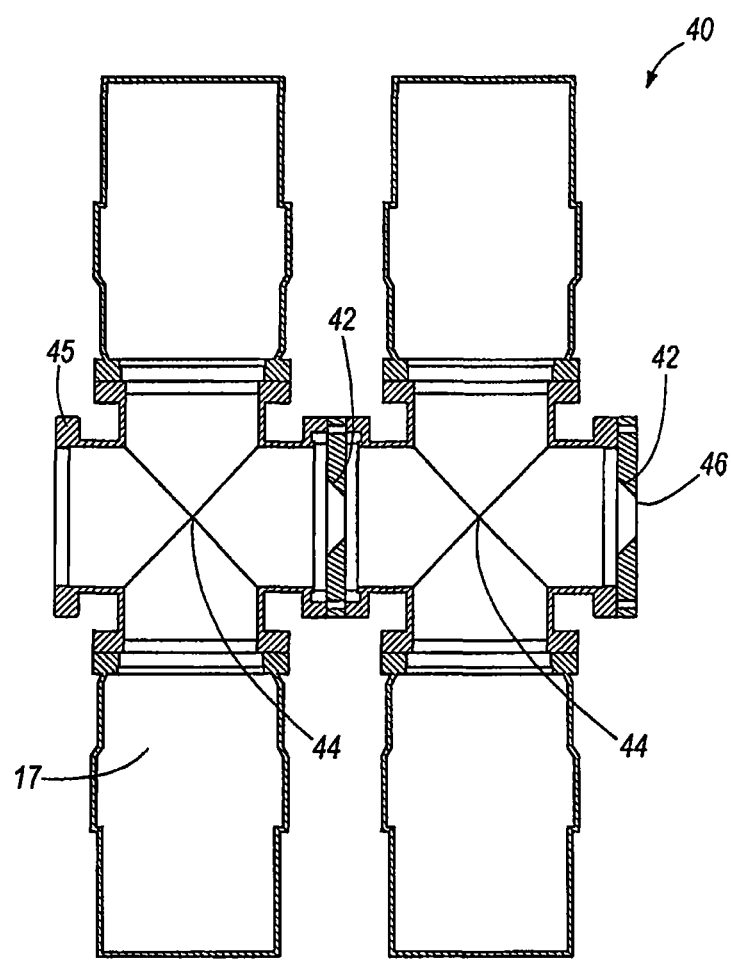
FIG. 9 is a sectional view of the differential pumping.

Differential pumping system 40 (FIG. 8 and FIG. 9) includes pressure reducing barriers 42 that suitably separate differential pumping system 40 into at least one stage. Pressure reducing barriers 42 each suitably include a thin solid plate or one or more long narrow tubes, typically 1 cm to 10 cm in diameter with a small hole in the center, suitably about 0.1 mm to about 10 cm in diameter, and more suitably about 1 mm to about 6 cm. Each stage comprises a vacuum chamber 44, associated pressure reducing barriers 42, and vacuum pumps 17, each with a vacuum pump exhaust 41. Each vacuum chamber 44 may have 1 or more, suitably 1 to 4, vacuum pumps 17, depending on whether it is a 3, 4, 5, or 6 port vacuum chamber 44. Two of the ports of the vacuum chamber 44 are suitably oriented on the beamline and used for ion beam entrance and exit from differential pumping system 40. The ports of each vacuum chamber 44 may also be in the same location as pressure reducing barriers 42. The remaining ports of each vacuum chamber 44 are suitably connected by conflat flanges to vacuum pumps 17 or may be connected to various instrumentation or control devices. The exhaust from vacuum pumps 17 is fed via vacuum pump exhaust 41 into an additional vacuum pump or compressor if necessary (not shown) and fed into gas filtration system 50. Alternatively, if needed, this additional vacuum pump may be located in between gas filtration system 50 and target chamber 60 or 70. If there is an additional compression stage, it may be between vacuum pumps 17 and filtration system 50. Differential pumping section is connected at one end to the accelerator 30 via an accelerator mating flange 45, and at the other at beam exit port 46 to target chamber (60 or 70) via a target chamber mating flange 43. Differential pumping system 40 may also include a turbulence generating apparatus (not shown) to disrupt laminar flow. A turbulence generating apparatus may restrict the flow of fluid and may include surface bumps or other features or combinations thereof to disrupt laminar flow. Turbulent flow is typically slower than laminar flow and may therefore decrease the rate of fluid leakage from the target chamber into the differential pumping section.

In some constructions, the pressure reducing barriers 42 are replaced or enhanced by plasma windows. Plasma windows include a small hole similar to those employed as pressure reducing barriers. However, a dense plasma is formed over the hole to inhibit the flow of gas through the small hole while still allowing the ion beam to pass. A magnetic or electric field is formed in or near the hole to hold the plasma in place.

Figure 10:
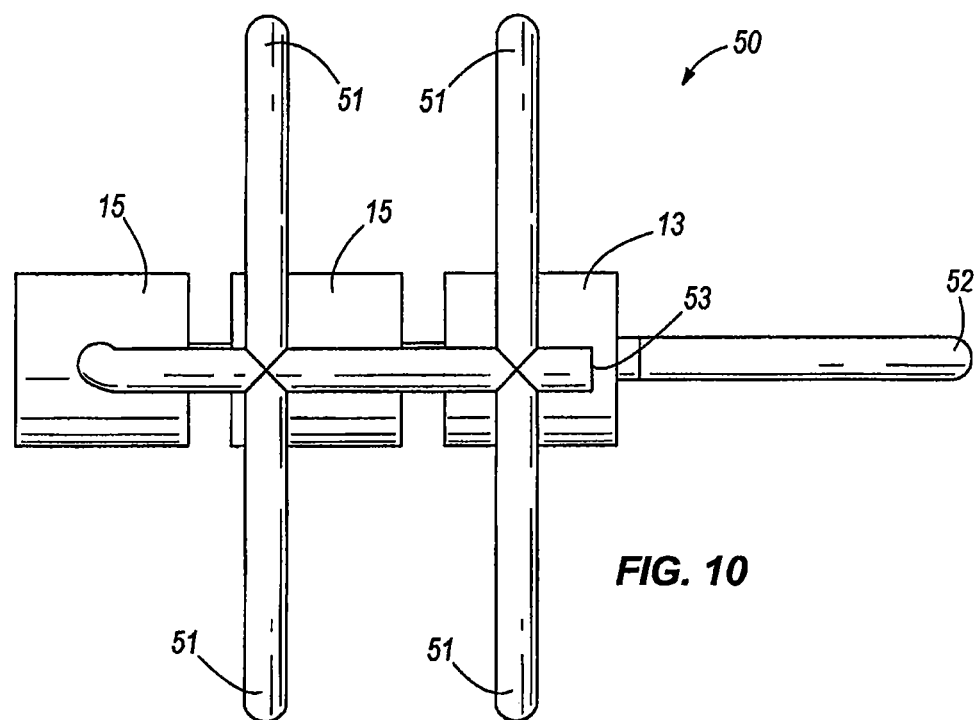
FIG. 10 is a first view of the gas filtration system.

Gas filtration system 50 is suitably connected at its vacuum pump isolation valves 51 to vacuum pump exhausts 41 of differential pumping system 40 or to additional compressors (not shown). Gas filtration system 50 (FIG. 10) includes one or more pressure chambers or "traps" (13, 15) over which vacuum pump exhaust 41 flows. The traps suitably capture fluid impurities that may escape the target chamber or ion source, which, for example, may have leaked into the system from the atmosphere. The traps may be cooled to cryogenic temperatures with liquid nitrogen (LN traps, 15). As such, cold liquid traps 13, 15 suitably cause gas such as atmospheric contaminants to liquefy and remain in traps 13, 15. After flowing over one or more LN traps 15 connected in series, the gas is suitably routed to a titanium getter trap 13, which absorbs contaminant hydrogen gasses such as deuterium that may escape the target chamber or the ion source and may otherwise contaminate the target chamber. The outlet of getter trap 13 is suitably connected to target chamber 60 or 70 via target chamber isolation valve 52 of gas filtration system 50. Gas filtration system 50 may be removed altogether from device 10, if one wants to constantly flow gas into the system and exhaust it out vacuum pump exhaust 41, to another vacuum pump exhaust (not shown), and to the outside of the system. Without gas filtration system 50, operation of apparatus 10 would not be materially altered. Apparatus 10, functioning as a neutron source, may not include getter trap 13 of gas filtration system 50.

Vacuum pump isolation valves 51 and target chamber isolation valves 52 may facilitate gas filtration system 50 to be isolated from the rest of the device and connected to an external pump (not shown) via pump-out valve 53 when the traps become saturated with gas. As such, if vacuum pump isolation valves 51 and target chamber isolation valves 52 are closed, pump-out valves 53 can be opened to pump out impurities.

Figure 11:
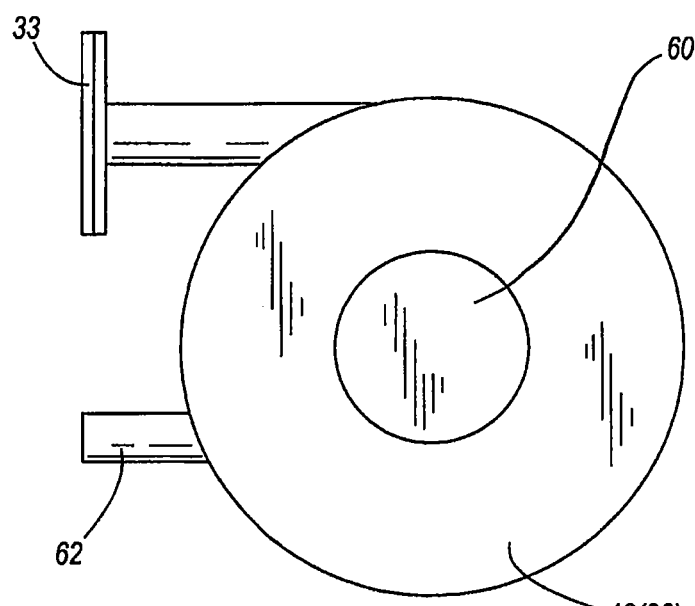
FIG. 11 is a first view of the magnetic target chamber.

Target chamber 60 (FIG. 11 and FIG. 12 for magnetic system 10) or target chamber 70 (FIG. 13 and FIG. 14 for the linear system 11) may be filled with the target gas to a pressure of about 0 to about 100 torr, about 100 mtorr to about 30 torr, suitably about 0.1 to about 10 torr, suitably about 100 mtorr to about 30 torr. The specific geometry of target chamber 60 or 70 may vary depending on its primary application and may include many variations. The target chamber may suitably be a cylinder about 10 cm to about 5 m long, and about 5 mm to about 100 cm in diameter for the linear system 14. When used in the hybrid reactor, the target chamber is arranged to provide an activation column in its center. The fusion portions are arranged to direct beams through the target chamber but outside of the activation column. Thus, the beams travel substantially within an annular space. Suitably, target chamber 70 may be about 0.1 m to about 2 m long, and about 30 to 50 cm in diameter for the linear system 14.

For the magnetic system 12, target chamber 60 may resemble a thick pancake, about 10 cm to about 1 m tall and about 10 cm to about 10 m in diameter. Suitably, the target chamber 60 for the magnetic system 12 may be about 20 cm to about 50 cm tall and approximately 50 cm in diameter. For the magnetic target chamber 60, a pair of either permanent magnets or electromagnets (ion confinement magnet 12) may be located on the faces of the pancake, outside of the vacuum walls or around the outer diameter of the target chamber (see FIG. 11 and FIG. 12). The magnets are suitably made of materials including but not limited to copper and aluminum, or superconductors or NdFeB for electromagnets. The poles of the magnets may be oriented such that they create an axial magnetic field in the bulk volume of the target chamber. The magnetic field is suitably controlled with a magnetic circuit comprising high permeability magnetic materials such as 1010 steel, mu-metal, or other materials. The size of the magnetic target chamber and the magnetic beam energy determine the field strength according to equation (1):

$$r = 1.44\sqrt{E}/B \tag{1}$$

for deuterons, wherein r is in meters, E is the beam energy in eV, and B is the magnetic field strength in gauss. The magnets may be oriented parallel to the flat faces of the pancake and polarized so that a magnetic field exists that is perpendicular to the direction of the beam from the accelerator 30, that is, the magnets may be mounted to the top and bottom of the chamber to cause ion recirculation. In another embodiment employing magnetic target chamber 60, there are suitably additional magnets on the top and bottom of the target chamber to create mirror fields on either end of the magnetic target chamber (top and bottom) that create localized regions of stronger magnetic field at both ends of the target chamber, creating a mirror effect that causes the ion beam to be reflected away from the ends of the target chamber. These additional magnets creating the mirror fields may be permanent magnets or electromagnets. It is also desirable to provide a stronger magnetic field near the radial edge of the target chamber to create a similar mirror effect. Again, a shaped magnetic circuit or additional magnets could be employed to provide the desired strong magnetic field. One end of the target chamber is operatively connected to differential pumping system 40 via differential pumping mating flange 33, and a gas recirculation port 62 allows for gas to re-enter the target chamber from gas filtration system 50. The target chamber may also include feedthrough ports (not shown) to allow for various isotope generating apparatus to be connected.

In the magnetic configuration of the target chamber 60, the magnetic field confines the ions in the target chamber. In the linear configuration of the target chamber 70, the injected ions are confined by the target gas. When used as a proton or neutron source, the target chamber may require shielding to protect the operator of the device from radiation, and the shielding may be provided by concrete walls suitably at least one foot thick. Alternatively, the device may be stored underground or in a bunker, distanced away from users, or water or other fluid may be used a shield, or combinations thereof.

Both differential pumping system 40 and gas filtration system 50 may feed into the target chamber 60 or 70. Differential pumping system 40 suitably provides the ion beam, while gas filtration system 50 supplies a stream of filtered gas to fill the target chamber. Additionally, in the case of isotope generation, a vacuum feedthrough (not shown) may be mounted to target chamber 60 or 70 to allow the isotope extraction system 90 to be connected to the outside.

Isotope extraction system 90, including the isotope generation system 63, may be any number of configurations to provide parent compounds or materials and remove isotopes generated inside or proximate the target chamber. For example, isotope generation system 63 may include an activation tube 64 (FIGS. 12 and 14) that is a tightly wound helix that fits just inside the cylindrical target chamber and having walls 65. Alternatively, in the case of the pancake target chamber with an ion confinement system 80, it may include a helix that covers the device along the circumference of the pancake and two spirals, one each on the top and bottom faces of the pancake, all connected in series. Walls 65 of activation tubes 64 used in these configurations are sufficiently strong to withstand rupture, yet sufficiently thin so that protons of over 14 MeV (approximately 10 to 20 MeV) may pass through them while still keeping most of their energy. Depending on the material, the walls of the tubing may be about 0.01 mm to about 1 mm thick, and suitably about 0.1 mm thick. The walls of the tubing are suitably made of materials that will not generate neutrons. The thin-walled tubing may be made from materials such as aluminum, carbon, copper, titanium, or stainless steel. Feedthroughs (not shown) may connect activation tube 64 to the outside of the system, where the daughter or product compound-rich fluid may go to a heat exchanger (not shown) for cooling and a chemical separator (not shown) where the daughter or product isotope compounds are separated from the mixture of parent compounds, daughter compounds, and impurities.

Figure 15:
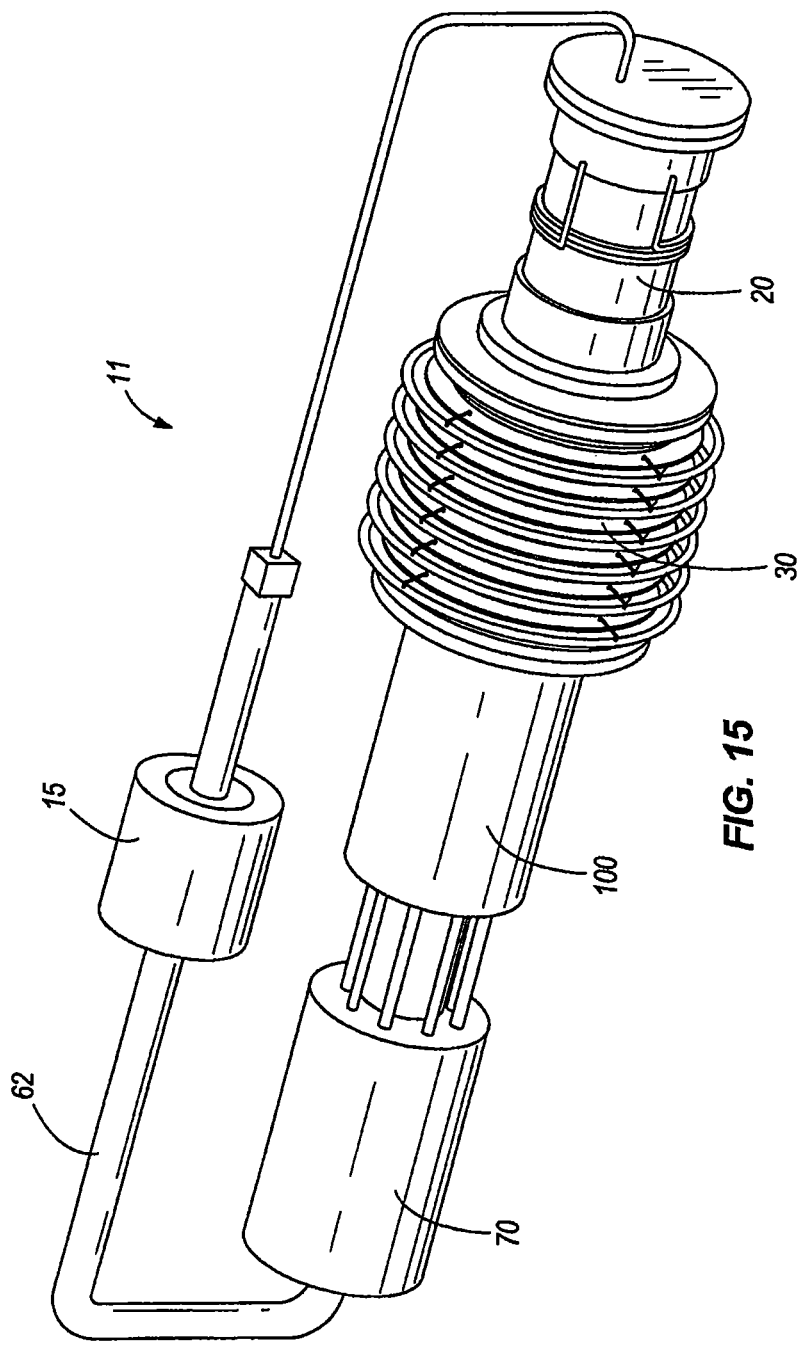
FIG. 15 is a first view of the generator with linear target chamber and synchronized high speed pump.
Figure 16:
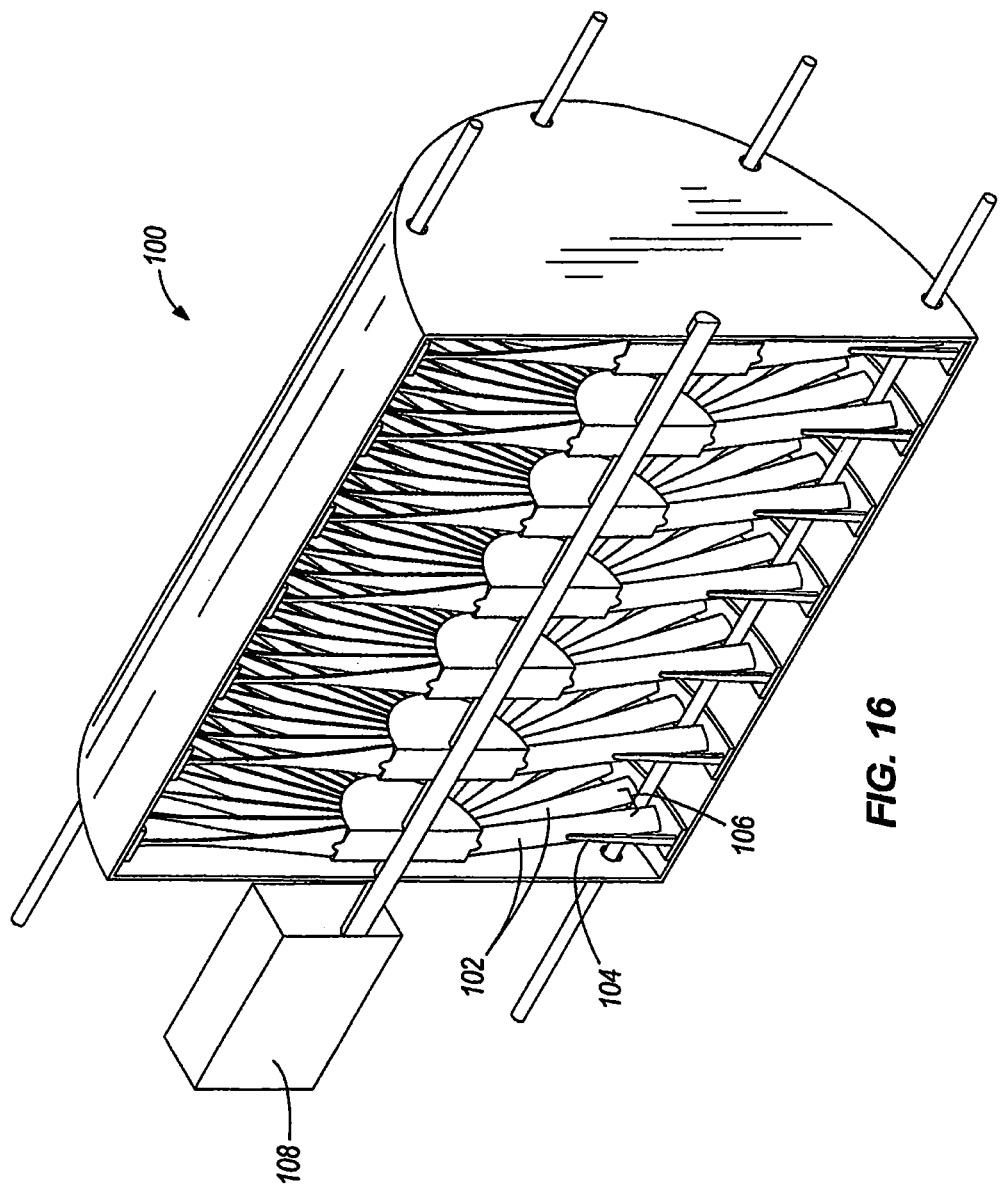
FIG. 16 is a sectional view of the synchronized high speed pump in extraction state, allowing passage of an ion beam.
Figure 17:
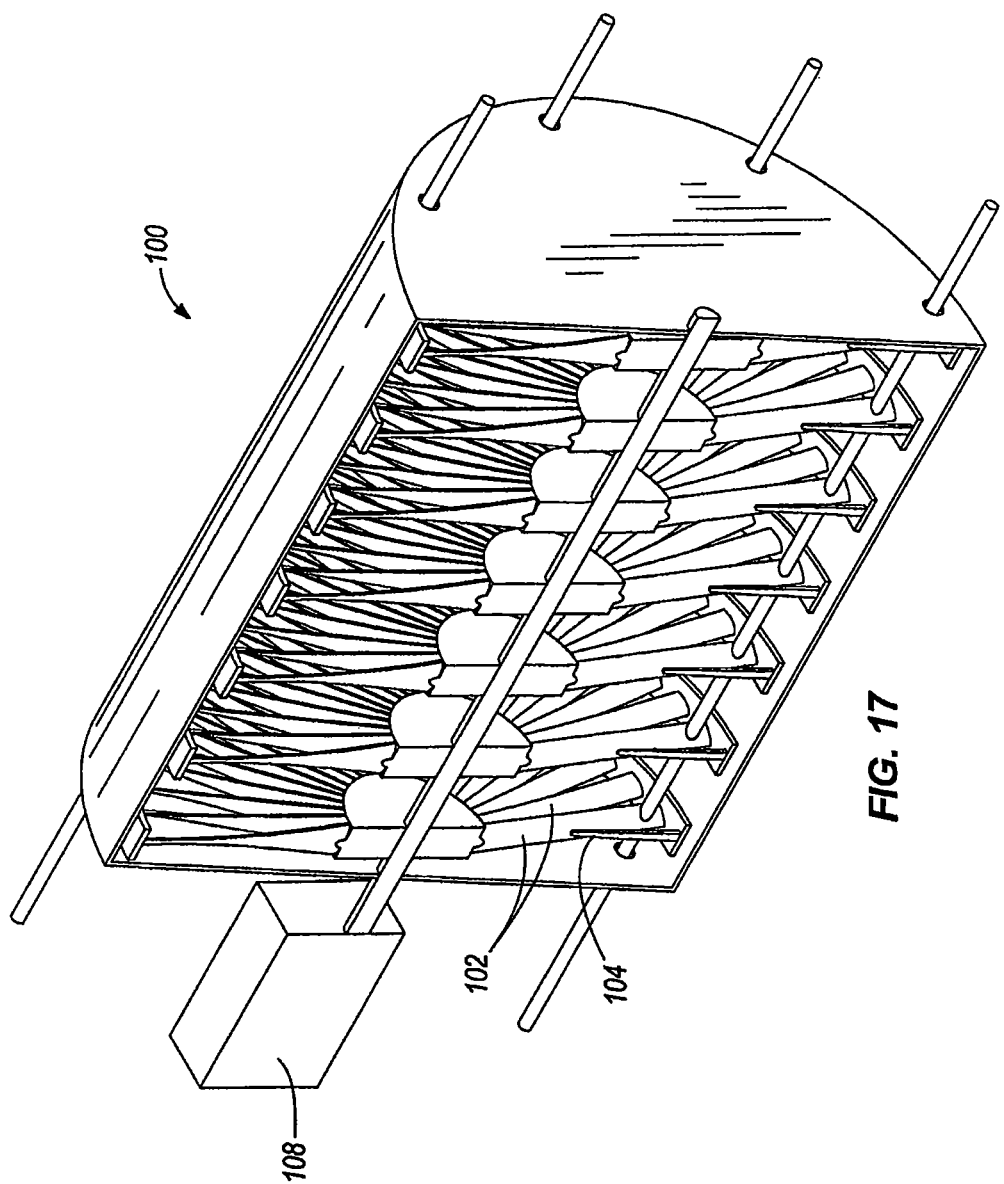
FIG. 17 is a sectional view of the synchronized high speed pump in suppression state, not allowing passage of an ion beam.
Figure 18:
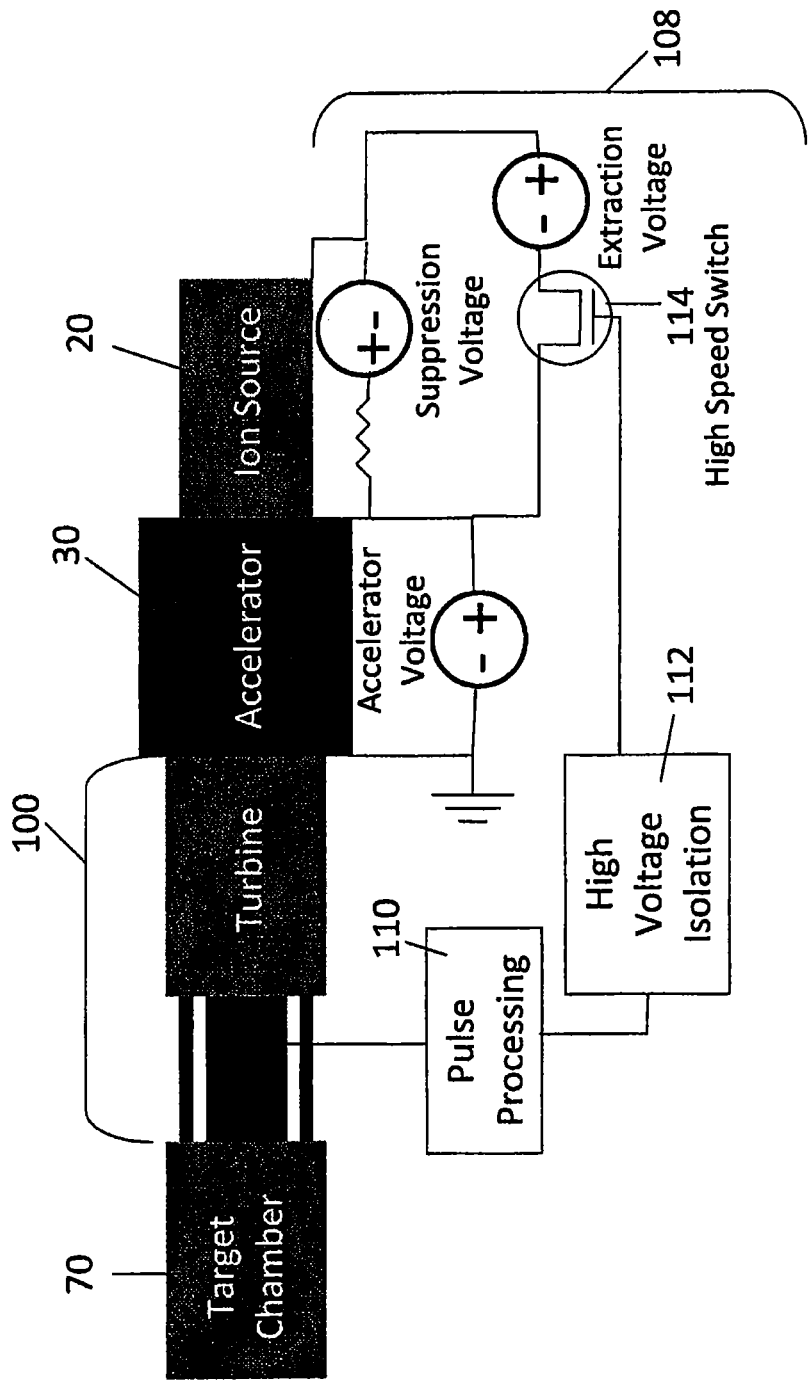
FIG. 18 is a schematic diagram of the generator with linear target chamber and synchronized high speed pump and one embodiment of controller.

In another construction, shown in FIG. 15, a high speed pump 100 is positioned in between accelerator 30 and target chamber 60 or 70. High speed pump 100 may replace the differential pumping system 40 and/or gas filtration system 50. The high speed pump suitably includes one or more blades or rotors 102 and a timing signal 104 that is operatively connected to a controller 108. The high speed pump may be synchronized with the ion beam flow from the accelerator section, such that the ion beam or beams are allowed to pass through at least one gap 106 in between or in blades 102 at times when gaps 106 are aligned with the ion beam. Timing signal 104 may be created by having one or more markers along the pump shaft or on at least one of the blades. The markers may be optical or magnetic or other suitable markers known in the art. Timing signal 104 may indicate the position of blades 102 or gap 106 and whether or not there is a gap aligned with the ion beam to allow passage of the ion beam from first stage 35 of accelerator 30 through high speed pump 100 to target chamber 60 or 70. Timing signal 104 may be used as a gate pulse switch on the ion beam extraction voltage to allow the ion beam to exit ion source 20 and accelerator 30 and enter high speed pump 100. When flowing through the system from ion source 20 to accelerator 30 to high speed pump 100 and to target chamber 60 or 70, the beam may stay on for a time period that the ion beam and gap 106 are aligned and then turn off before and while the ion beam and gap 106 are not aligned. The coordination of timing signal 104 and the ion beam may be coordinated by a controller 108. In one embodiment of controller 108 (FIG. 18), controller 108 may comprise a pulse processing unit 110, a high voltage isolation unit 112, and a high speed switch 114 to control the voltage of accelerator 30 between suppression voltage (ion beam off; difference may be 5-10 kV) and extraction voltage (ion beam on; difference may be 20 kv). Timing signal 104 suitably creates a logic pulse that is passed through delay or other logic or suitable means known in the art. Pulse processing unit 110 may alter the turbine of the high speed pump to accommodate for delays, and high speed switch 114 may be a MOSFET switch or other suitable switch technology known in the art. High voltage isolation unit 112 may be a fiber optic connection or other suitable connections known in the art. For example, the timing signal 104 may indicate the presence or absence of a gap 106 only once per rotation of a blade 102, and the single pulse may signal a set of electronics via controller 108 to generate a set of n pulses per blade revolution, wherein n gaps are present in one blade rotation. Alternatively, timing signal 104 may indicate the presence or absence of a gap 106 for each of m gaps during a blade rotation, and the m pulses may each signal a set of electronics via controller 108 to generate a pulse per blade revolution, wherein m gaps are present in one blade rotation. The logic pulses may be passed or coordinated via controller 108 to the first stage of accelerator section 35 (ion extractor), such that the logic pulse triggers the first stage of accelerator section 35 to change from a suppression state to an extraction state and visa versa. If the accelerator were +300 kV, for example, the first stage of accelerator 35 may be biased to +295 kV when there is no gap 106 in high speed pump 100, so that the positive ion beam will not flow from +295 kV to +300 kV, and the first stage of accelerator 35 may be biased to +310 kV when there is a gap 106 in high speed pump 100, so that the ion beam travels through accelerator 30 and through gaps 106 in high speed pump 100 to target chamber 60 or 70. The difference in voltage between the suppression and extraction states may be a relatively small change, such as about 1 kV to about 50 kV, suitably about 10 kV to about 20 kV. A small change in voltage may facilitate a quick change between suppression (FIG. 17) and extraction (FIG. 16) states. Timing signal 104 and controller 108 may operate by any suitable means known in the art, including but not limited to semiconductors and fiber optics. The period of time that the ion beam is on and off may depend on factors such as the rotational speed of blades 102, the number of blades or gaps 106, and the dimensions of the blades or gaps.

Figure 12:
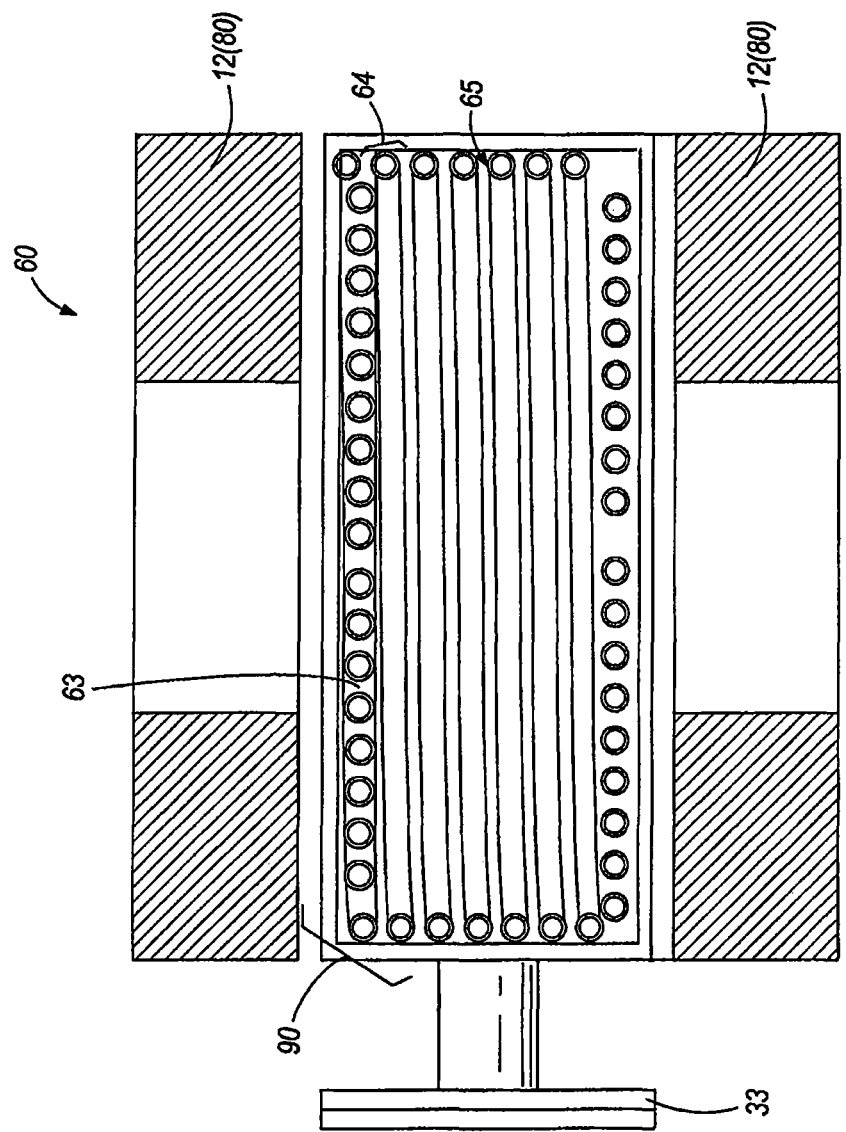
FIG. 12 is a sectional view of the magnetic target chamber.
Figure 13:
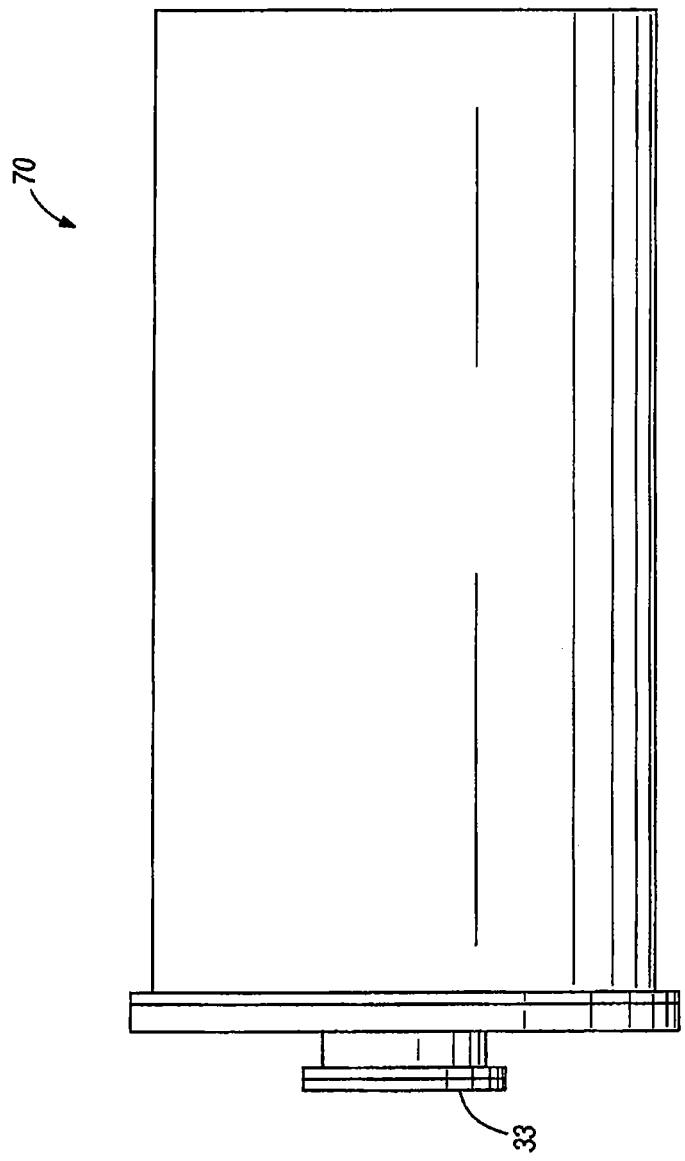
FIG. 13 is a first view of the linear target chamber.
Figure 14:
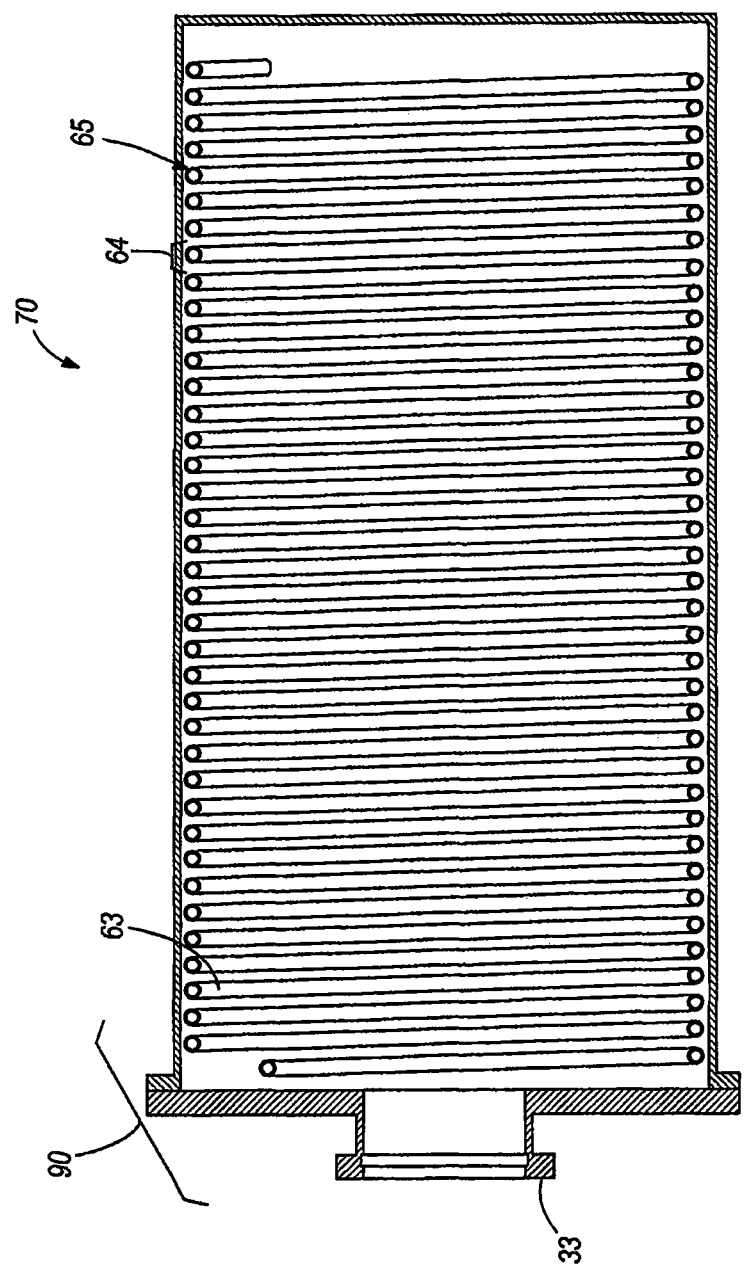
FIG. 14 is a sectional view of the linear target chamber, showing an exemplary isotope generation system for $^{18}F$ and $^{13}N$ production.

The isotopes $^{18}$F and $^{13}$N, which are utilized in PET scans, may be generated from the nuclear reactions inside each fusion portion using an arrangement as illustrated in FIGS. 12 and 14. These isotopes can be created from their parent isotopes, $^{18}$O (for $^{18}$F) and $^{16}$O (for $^{13}$N) by proton bombardment. The source of the parent may be a fluid, such as water (H$_2$$^{18}$O or H$_2$$^{16}$O), that may flow through the isotope generation system via an external pumping system (not shown) and react with the high energy protons in the target chamber to create the desired daughter compound. For the production of $^{18}$F or $^{13}$N, water (H$_2$$^{18}$O or H$_2$$^{16}$O, respectively) is flowed through isotope generation system 63, and the high energy protons created from the aforementioned fusion reactions may penetrate tube 64 walls and impact the parent compound and cause (p,α) reactions producing $^{18}$F or $^{13}$N. In a closed system, for example, the isotope-rich water may then be circulated through the heat exchanger (not shown) to cool the fluid and then into the chemical filter (not shown), such as an ion exchange resin, to separate the isotope from the fluid. The water mixture may then recirculate into target chamber (60 or 70), while the isotopes are stored in a filter, syringe, or by other suitable means known in the art until enough has been produced for imaging or other procedures.

While a tubular spiral has been described, there are many other geometries that could be used to produce the same or other radionuclides. For example, isotope generation system 63 may suitably be parallel loops or flat panel with ribs. In another embodiment, a water jacket may be attached to the vacuum chamber wall. For $^{18}$F or $^{13}$N creation, the spiral could be replaced by any number of thin walled geometries including thin windows, or could be replaced by a solid substance that contained a high oxygen concentration, and would be removed and processed after transmutation. Other isotopes can be generated by other means.

With reference to FIGS. 1 and 3, the operation of the fusion portions will now be described. Before operation of one of the fusion portions, the respective target chamber 60 or 70 is suitably filled by first pre-flowing the target gas, such as $^3$He, through the ion source 20 with the power off, allowing the gas to flow through the apparatus 10 and into the target chamber. In operation, a reactant gas such as $^2$H$_2$ enters the ion source 20 and is positively ionized by the RF field to form plasma 22. As plasma 22 inside vacuum chamber 25 expands toward ion injector 26, plasma 22 starts to be affected by the more negative potential in accelerator 30. This causes the positively charged ions to accelerate toward target chamber 60 or 70. Acceleration electrodes 32 of the stages (23 and 35) in ion source 20 collimate the ion beam or beams, giving each a nearly uniform ion beam profile across the first stage of accelerator 30. Alternatively, the first stage of accelerator 30 may enable pulsing or on/off switching of the ion beam, as described above. As the beam continues to travel through accelerator 30, it picks up additional energy at each stage, reaching energies of up to 5 MeV, up to 1 MeV, suitably up to 500 keV, suitably 50 keV to 5 MeV, suitably 50 keV to 500 keV, and suitably 0 to 10 Amps, suitably 10 to 100 mAmps, by the time it reaches the last stage of the accelerator 30. This potential is supplied by an external power source (not shown) capable of producing the desired voltage. Some neutral gas from ion source 20 may also leak out into accelerator 30, but the pressure in accelerator 30 will be kept to a minimum by differential pumping system 40 or synchronized high speed pump 100 to prevent excessive pressure and system breakdown. The beam continues at high velocity into differential pumping 40 where it passes through the relatively low pressure, short path length stages with minimal interaction. From here it continues into target chamber 60 or 70, impacting the high density target gas that is suitably 0 to 100 torr, suitably 100 mtorr to 30 torr, suitably 5 to 20 torr, slowing down and creating nuclear reactions. The emitted nuclear particles may be about 0.3 MeV to about 30 MeV protons, suitably about 10 MeV to about 20 MeV protons, or about 0.1 MeV to about 30 MeV neutrons, suitably about 2 MeV to about 20 MeV neutrons.

In the embodiment of linear target chamber 70, the ion beam continues in an approximately straight line and impacts the high density target gas to create nuclear reactions until it stops.

In the embodiment of magnetic target chamber 60, the ion beam is bent into an approximately helical path, with the radius of the orbit (for deuterium ions, $^2$H) given by the equation (2):

$$r = \frac{204 * \sqrt{E_i}}{B} \quad (2)$$

where r is the orbital radius in cm, $E_i$ is the ion energy in eV, and B is the magnetic field strength in gauss. For the case of a 500 keV deuterium beam and a magnetic field strength of 7 kG, the orbital radius is about 20.6 cm and suitably fits inside a 25 cm radius chamber. While ion neutralization can occur, the rate at which re-ionization occurs is much faster, and the particle will spend the vast majority of its time as an ion.

Once trapped in this magnetic field, the ions orbit until the ion beam stops, achieving a very long path length in a short chamber. Due to this increased path length relative to linear target chamber 70, magnetic target chamber 60 can also operate at lower pressure. Magnetic target chamber 60, thus, may be the more suitable configuration. A magnetic target chamber can be smaller than a linear target chamber and still maintain a long path length, because the beam may recirculate many times within the same space. The fusion products may be more concentrated in the smaller chamber. As explained, a magnetic target chamber may operate at lower pressure than a linear chamber, easing the burden on the pumping system because the longer path length may give the same total number of collisions with a lower pressure gas as with a short path length and a higher pressure gas of the linac chamber.

Due to the pressure gradient between accelerator 30 and target chamber 60 or 70, gas may flow out of the target chamber and into differential pumping system 40. Vacuum pumps 17 may remove this gas quickly, achieving a pressure reduction of approximately 10 to 100 times or greater. This "leaked" gas is then filtered and recycled via gas filtration system 50 and pumped back into the target chamber, providing more efficient operation. Alternatively, high speed pump 100 may be oriented such that flow is in the direction back into the target chamber, preventing gas from flowing out of the target chamber.

While the invention described herein is directed to a hybrid reactor, it is possible to produce certain isotopes using the fusion portion alone. If this is desired, an isotope extraction system 90 as described herein is inserted into target chamber 60 or 70. This device allows the high energy protons to interact with the parent nuclide of the desired isotope. For the case of $^{18}F$ production or $^{13}N$ production, this target may be water-based ($^{16}O$ for $^{13}N$, and $^{18}O$ for $^{18}F$) and will flow through thin-walled tubing. The wall thickness is thin enough that the 14.7 MeV protons generated from the fusion reactions will pass through them without losing substantial energy, allowing them to transmute the parent isotope to the desired daughter isotope. The $^{13}N$ or $^{18}F$ rich water then is filtered and cooled via external system. Other isotopes, such as $^{124}I$ (from $^{124}Te$ or others), $^{11}C$ (from $^{14}N$ or $^{11}B$ or others), $^{15}O$ (from $^{15}N$ or others), and $^{63}Zn$, may also be generated. In constructions that employ the fission portion to generate the desired isotopes, the isotope extraction system 90 can be omitted.

If the desired product is protons for some other purpose, target chamber 60 or 70 may be connected to another apparatus to provide high energy protons to these applications. For example, the a fusion portion may be used as an ion source for proton therapy, wherein a beam of protons is accelerated and used to irradiate cancer cells.

If the desired product is neutrons, no hardware such as isotope extraction system 90 is required, as the neutrons may penetrate the walls of the vacuum system with little attenuation. For neutron production, the fuel in the injector is changed to either deuterium or tritium, with the target material changed to either tritium or deuterium, respectively. Neutron yields of up to about $10^{15}$ neutrons/sec or more may be generated. Additionally, getter trap 13 may be removed. The parent isotope compound may be mounted around target chamber 60 or 70, and the released neutrons may convert the parent isotope compound to the desired daughter isotope compound. Alternatively, an isotope extraction system may still or additionally be used inside or proximal to the target chamber. A moderator (not shown) that slows neutrons may be used to increase the efficiency of neutron interaction. Moderators in neutronics terms may be any material or materials that slow down neutrons. Suitable moderators may be made of materials with low atomic mass that are unlikely to absorb thermal neutrons. For example, to generate Mo-99 from a Mo-98 parent compound, a water moderator may be used. Mo-99 decays to Tc-99m, which may be used for medical imaging procedures. Other isotopes, such as I-131, Xe-133, In-111, and 1-125, may also be generated. When used as a neutron source, the fusion portion may include shielding such as concrete or a fluid such as water at least one foot thick to protect the operators from radiation. Alternatively, the neutron source may be stored underground to protect the operators from radiation. The manner of usage and operation of the invention in the neutron mode is the same as practiced in the above description.

The fusion rate of the beam impacting a thick target gas can be calculated. The incremental fusion rate for the ion beam impacting a thick target gas is given by the equation (3):

$$df(E) = n_b * \frac{I_{ion}}{e} * \sigma(E) * dl \quad (3)$$

where df(E) is the fusion rate (reactions/sec) in the differential energy interval dE, $n_b$ is the target gas density (particles/m³), $I_{ion}$ is the ion current (A), e is the fundamental charge of $1.6022*10^{-19}$ coulombs/particle, σ(E) is the energy dependent cross section (m²) and dl is the incremental path length at which the particle energy is E. Since the particle is slowing down once inside the target, the particle is only at energy E over an infinitesimal path length.

Figure 19:
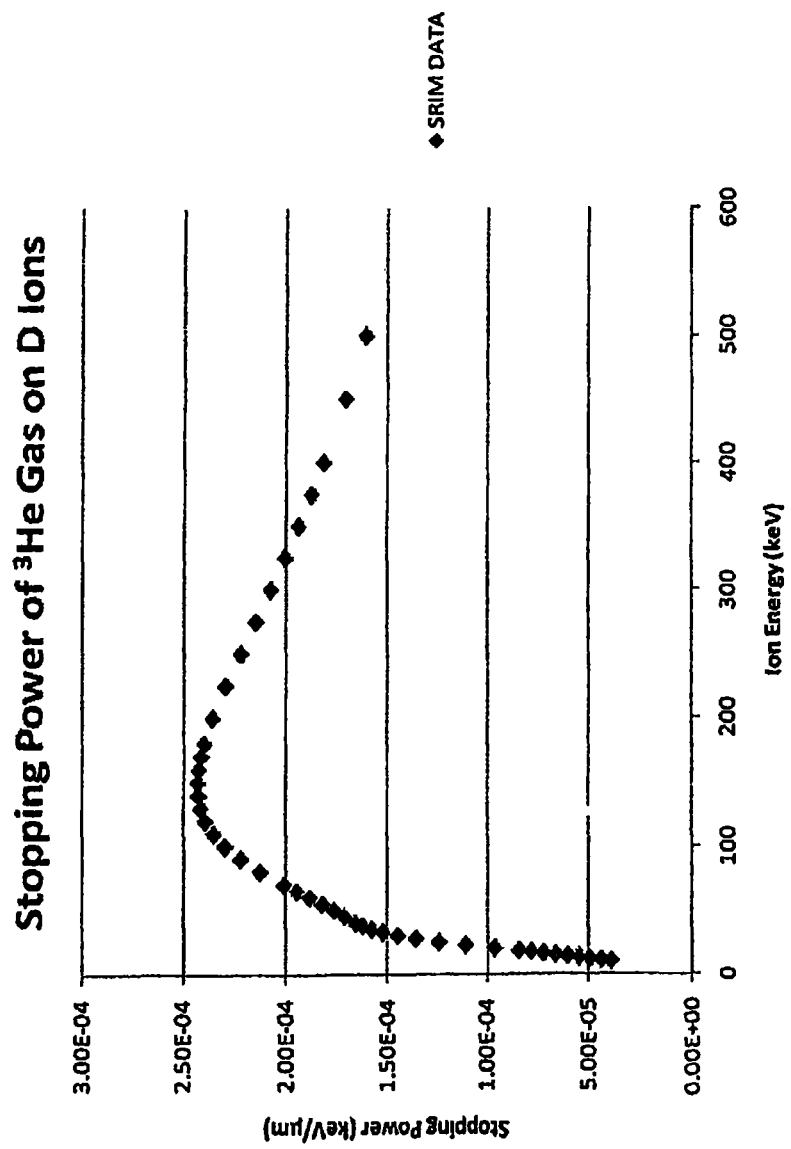
FIG. 19 is a graph of stopping power (keV/μm) versus ion energy (keV) for the stopping power of $^3He$ gas on $^2H$ ions at 10 torr gas pressure and 25° C.

To calculate the total fusion rate from a beam stopping in a gas, equation (2) is integrated over the entire particle path length from where its energy is at its maximum of $E_i$ to where it stops as shown in equation (4):

$$F(E_i) = \int_0^{E_i} n_b * \frac{I_{ion}}{e} * \sigma(E) dl = \frac{n_b I_{ion}}{e} \int_0^{E_i} \sigma(E) dl \quad (4)$$

where $F(E_i)$ is the total fusion rate for a beam of initial energy $E_i$ stopping in the gas target. To solve this equation, the incremental path length dl is solved for in terms of energy. This relationship is determined by the stopping power of the gas, which is an experimentally measured function, and can be fit by various types of functions. Since these fits and fits of the fusion cross section tend to be somewhat complicated, these integrals were solved numerically. Data for the stopping of deuterium in $^3He$ gas at 10 torr and 25° C. was obtained from the computer program Stopping and Range of Ions in Matter (SRIM; James Ziegler, www.srim.org) and is shown in FIG. 19.

Figure 20:
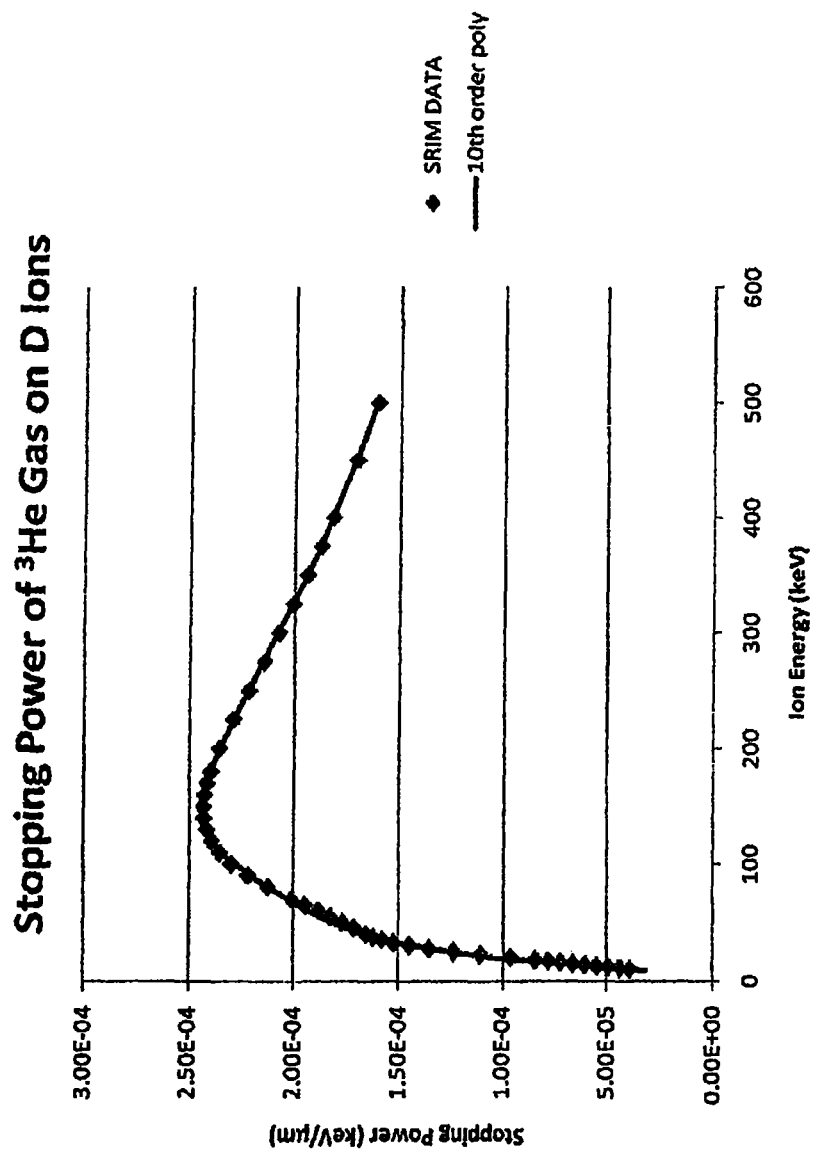
FIG. 20 is a graph of stopping power (keV/μm) versus ion energy (keV) for the stopping power of $^3He$ gas on $^2H$ ions at 10 torr gas pressure and 25° C.

An equation was used to predict intermediate values. A polynomial of order ten was fit to the data shown in FIG. 19. The coefficients are shown in TABLE 1, and resultant fit with the best-fit $10^{th}$ order polynomial is shown in FIG. 20.

TABLE 1

| Order | Coefficient |
|---|---|
| 10 | −1.416621E−27 |
| 9 | 3.815365E−24 |
| 8 | −4.444877E−21 |
| 7 | 2.932194E−18 |
| 6 | −1.203915E−15 |
| 5 | 3.184518E−13 |
| 4 | −5.434029E−11 |
| 3 | 5.847578E−09 |
| 2 | −3.832260E−07 |
| 1 | 1.498854E−05 |
| 0 | −8.529514E−05 |

As can be seen from these data, the fit was quite accurate over the energy range being considered. This relationship allowed the incremental path length, dl, to be related to an incremental energy interval by the polynomial tabulated above. To numerically solve this, it is suitable to choose either a constant length step or a constant energy step, and calculate either how much energy the particle has lost or how far it has gone in that step. Since the fusion rate in equation (4) is in terms of dl, a constant length step was the method used. The recursive relationship for the particle energy E as it travels through the target is the equation (5):

$$E_{n+1} = E_n - S(E)*dl \quad (5)$$

where n is the current step (n=0 is the initial step, and $E_o$ is the initial particle energy), $E_{n+1}$ is the energy in the next incremental step, S(E) is the polynomial shown above that relates the particle energy to the stopping power, and dl is the size of an incremental step. For the form of the incremental energy shown above, E is in keV and dl is in μm.

This formula yields a way to determine the particle energy as it moves through the plasma, and this is important because it facilitates evaluation of the fusion cross section at each energy, and allows for the calculation of a fusion rate in any incremental step. The fusion rate in the numerical case for each step is given by the equation (6):

$$f_n(E) = n_b * \frac{I_{ion}}{e} * \sigma(E_n) * dl \quad (6)$$

To calculate the total fusion rate, this equation was summed over all values of $E_n$ until E=0 (or n*dl=the range of the particle) as shown in equation (7):

$$F(E_o) = \sum_{n=0}^{n*dl=range} f_n(E) \quad (7)$$

This fusion rate is known as the "thick-target yield". To solve this, an initial energy was determined and a small step size dl chosen. The fusion rate in the interval dl at full energy was calculated. Then the energy for the next step was calculated, and the process repeated. This goes on until the particle stops in the gas.

Figure 21:
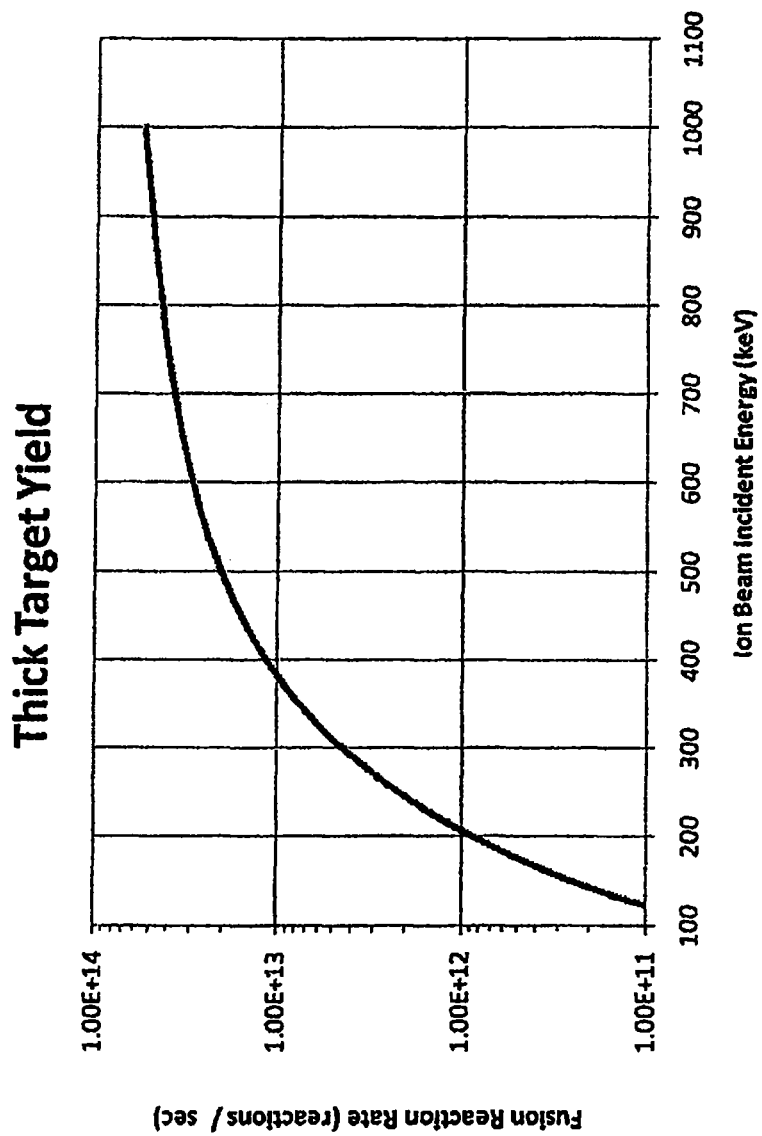
FIG. 21 is a graph of fusion reaction rate (reactions/second) versus ion beam incident energy (keV) for a 100 mA incident $^2H$ beam impacting a $^3He$ target at 10 torr.

For the case of a singly ionized deuterium beam impacting a 10 torr helium-3 gas background at room temperature, at an energy of 500 keV and an intensity of 100 mA, the fusion rate was calculated to be approximately $2\times10^{13}$ fusions/second, generating the same number of high energy protons (equivalent to 3 μA protons). This level is sufficient for the production of medical isotopes, as is known by those of skill in the art. A plot showing the fusion rate for a 100 mA incident deuterium beam impacting a helium-3 target at 10 torr is shown in FIG. 21.

The fusion portions as described herein may be used in a variety of different applications. According to one construction, the fusion portions are used as a proton source to transmutate materials including nuclear waste and fissile material. The fusion portions may also be used to embed materials with protons to enhance physical properties. For example, the fusion portion may be used for the coloration of gemstones. The fusion portions also provide a neutron source that may be used for neutron radiography. As a neutron source, the fusion portions may be used to detect nuclear weapons. For example, as a neutron source the fusion portions may be used to detect special nuclear materials, which are materials that can be used to create nuclear explosions, such as Pu, $^{233}$U, and materials enriched with $^{233}$U or $^{235}$U. As a neutron source, the fusion portions may be used to detect underground features including but not limited to tunnels, oil wells, and underground isotopic features by creating neutron pulses and measuring the reflection and/or refraction of neutrons from materials. The fusion portions may be used as a neutron source in neutron activation analysis (NAA), which may determine the elemental composition of materials. For example, NAA may be used to detect trace elements in the picogram range. As a neutron source, the fusion portions may also be used to detect materials including but not limited to clandestine materials, explosives, drugs, and biological agents by determining the atomic composition of the material. The fusion portions may also be used as a driver for a sub-critical reactor.

The operation and use of the fusion portion 10, 11 is further exemplified by the following examples, which should not be construed by way of limiting the scope of the invention.

The fusion portions 10, 11 can be arranged in the magnetic configuration 10 to function as a neutron source. In this arrangement, initially, the system 10 will be clean and empty, containing a vacuum of $10^{-9}$ torr or lower, and the high speed pumps 17 will be up to speed (two stages with each stage being a turbomolecular pump). Approximately 25-30 standard cubic centimeters of gas (deuterium for producing neutrons) will be flowed into the target chamber 60 to create the target gas. Once the target gas has been established, that is, once the specified volume of gas has been flowed into the system and the pressure in the target chamber 60 reaches approximately 0.5 torr, a valve will be opened which allows a flow of 0.5 to 1 sccm (standard cubic centimeters per minute) of deuterium from the target chamber 60 into the ion source 20. This gas will re-circulate rapidly through the system, producing approximately the following pressures: in the ion source 20 the pressure will be a few mtorr; in the accelerator 30 the pressure will be around 20 μtorr; over the pumping stage nearest the accelerator, the pressure will be <20 μtorr; over the pumping stage nearest the target chamber, the pressure will be approximately 50 mtorr; and in the target chamber 60 the pressure will be approximately 0.5 torr. After these conditions are established, the ion source 20 (using deuterium) will be excited by enabling the RF power supply (coupled to the RF antenna 24 by the RF matching circuit) to about 10-30 MHz. The power level will be increased from zero to about 500 W creating a dense deuterium plasma with a density on the order of $10^{11}$ particles/cm$^3$. The ion extraction voltage will be increased to provide the desired ion current (approximately 10 mA) and focusing. The accelerator voltage will then be increased to 300 kV, causing the ion beam to accelerate through the flow restrictions and into the target chamber 60. The target chamber 60 will be filled with a magnetic field of approximately 5000 gauss (or 0.5 tesla), which causes the ion beam to re-circulate. The ion beam will make approximately 10 revolutions before dropping to a negligibly low energy.

While re-circulating, the ion beam will create nuclear reactions with the target gas, producing $4 \times 10^{10}$ and up to $9 \times 10^{10}$ neutrons/sec for D. These neutrons will penetrate the target chamber 60, and be detected with appropriate nuclear instrumentation.

Neutral gas that leaks from the target chamber 60 into the differential pumping section 40 will pass through the high speed pumps 17, through a cold trap 13, 15, and back into the target chamber 60. The cold traps 13, 15 will remove heavier gasses that in time can contaminate the system due to very small leaks.

The fusion portions 11 can also be arranged in the linear configuration to function as a neutron source. In this arrangement, initially, the system will be clean and empty, containing a vacuum of $10^{-9}$ torr or lower and the high speed pumps 17 will be up to speed (three stages, with the two nearest that accelerator being turbomolecular pumps and the third being a different pump such as a roots blower). Approximately 1000 standard cubic centimeters of deuterium gas will be flowed into the target chamber 70 to create the target gas. Once the target gas has been established, a valve will be opened which allows a flow of 0.5 to 1 sccm (standard cubic centimeters per minute) from the target chamber 70 into the ion source 20. This gas will re-circulate rapidly through the system, producing approximately the following pressures: in the ion source 20 the pressure will be a few mtorr; in the accelerator 30 the pressure will be around 20 µtorr; over the pumping stage nearest the accelerator, the pressure will be <20 µtorr; over the center pumping stage the pressure will be approximately 50 mtorr; over the pumping stage nearest the target chamber 70, the pressure will be approximately 500 mtorr; and in the target chamber 70 the pressure will be approximately 20 torr.

After these conditions are established, the ion source 20 (using deuterium) will be excited by enabling the RF power supply (coupled to the RF antenna 24 by the RF matching circuit) to about 10-30 MHz. The power level will be increased from zero to about 500 W creating a dense deuterium plasma with a density on the order of $10^{11}$ particles/cm$^3$. The ion extraction voltage will be increased to provide the desired ion current (approximately 10 mA) and focusing. The accelerator voltage will then be increased to 300 kV, causing the ion beam to accelerate through the flow restrictions and into the target chamber 70. The target chamber 70 will be a linear vacuum chamber in which the beam will travel approximately 1 meter before dropping to a negligibly low energy.

While passing through the target gas, the beam will create nuclear reactions, producing $4 \times 10^{10}$ and up to $9 \times 10^{10}$ neutrons/sec. These protons will penetrate the target chamber 70, and be detected with appropriate nuclear instrumentation.

Neutral gas that leaks from the target chamber 70 into the differential pumping section 40 will pass through the high speed pumps 17, through a cold trap 13, 15, and back into the target chamber 70. The cold traps 13, 15 will remove heavier gasses that in time can contaminate the system due to very small leaks.

In another construction, the fusion portions 10 are arranged in the magnetic configuration and are operable as proton sources. In this construction, initially, the system will be clean and empty, containing a vacuum of $10^{-9}$ torr or lower, and the high speed pumps 17 will be up to speed (two stages with each stage being a turbomolecular pump). Approximately 25-30 standard cubic centimeters of gas (an approximate 50/50 mixture of deuterium and helium-3 to generate protons) will be flowed into the target chamber 60 to create the target gas. Once the target gas has been established, that is, once the specified volume of gas has been flowed into the system and the pressure in the target chamber 60 reaches approximately 0.5 torr, a valve will be opened which allows a flow of 0.5 to 1 sccm (standard cubic centimeters per minute) of deuterium from the target chamber 60 into the ion source 20. This gas will re-circulate rapidly through the system, producing approximately the following pressures: in the ion source 20 the pressure will be a few mtorr; in the accelerator 30 the pressure will be around 20 µtorr; over the pumping stage nearest the accelerator 30, the pressure will be <20 µtorr; over the pumping stage nearest the target chamber 60, the pressure will be approximately 50 mtorr; and in the target chamber 60 the pressure will be approximately 0.5 torr. After these conditions are established, the ion source 20 (using deuterium) will be excited by enabling the RF power supply (coupled to the RF antenna 24 by the RF matching circuit) to about 10-30 MHz. The power level will be increased from zero to about 500 W creating a dense deuterium plasma with a density on the order of $10^{11}$ particles/cm$^3$. The ion extraction voltage will be increased to provide the desired ion current (approximately 10 mA) and focusing. The accelerator voltage will then be increased to 300 kV, causing the ion beam to accelerate through the flow restrictions and into the target chamber 60. The target chamber 60 will be filled with a magnetic field of approximately 5000 gauss (or 0.5 tesla), which causes the ion beam to re-circulate. The ion beam will make approximately 10 revolutions before dropping to a negligibly low energy.

While re-circulating, the ion beam will create nuclear reactions with the target gas, producing $1 \times 10^{11}$ and up to about $5 \times 10^{11}$ protons/sec. These protons will penetrate the tubes of the isotope extraction system, and be detected with appropriate nuclear instrumentation.

Neutral gas that leaks from the target chamber 60 into the differential pumping section 40 will pass through the high speed pumps 17, through a cold trap 13, 15, and back into the target chamber 60. The cold traps 13, 15 will remove heavier gasses that in time can contaminate the system due to very small leaks.

In another construction, the fusion portions 11 are arranged in the linear configuration and are operable as proton sources. In this construction, initially, the system will be clean and empty, containing a vacuum of $10^{-9}$ torr or lower and the high speed pumps 17 will be up to speed (three stages, with the two nearest that accelerator being turbomolecular pumps and the third being a different pump such as a roots blower). Approximately 1000 standard cubic centimeters of about 50/50 mixture of deuterium and helium-3 gas will be flowed into the target chamber 70 to create the target gas. Once the target gas has been established, a valve will be opened which allows a flow of 0.5 to 1 sccm (standard cubic centimeters per minute) from the target chamber 70 into the ion source 20. This gas will re-circulate rapidly through the system, producing approximately the following pressures: in the ion source 20 the pressure will be a few mtorr; in the accelerator 30 the pressure will be around 20 μtorr; over the pumping stage nearest the accelerator 30, the pressure will be <20 μtorr; over the center pumping stage the pressure will be approximately 50 mtorr; over the pumping stage nearest the target chamber 70, the pressure will be approximately 500 mtorr; and in the target chamber 70 the pressure will be approximately 20 torr.

After these conditions are established, the ion source 20 (using deuterium) will be excited by enabling the RF power supply (coupled to the RF antenna 24 by the RF matching circuit) to about 10-30 MHz. The power level will be increased from zero to about 500 W creating a dense deuterium plasma with a density on the order of $10^{11}$ particles/cm$^3$. The ion extraction voltage will be increased to provide the desired ion current (approximately 10 mA) and focusing. The accelerator voltage will then be increased to 300 kV, causing the ion beam to accelerate through the flow restrictions and into the target chamber 70. The target chamber 70 will be a linear vacuum chamber in which the beam will travel approximately 1 meter before dropping to a negligibly low energy.

While passing through the target gas, the beam will create nuclear reactions, producing $1 \times 10^{11}$ and up to about $5 \times 10^{11}$ protons/sec. These neutrons will penetrate the walls of the tubes of the isotope extraction system, and be detected with appropriate nuclear instrumentation.

Neutral gas that leaks from the target chamber 70 into the differential pumping section 40 will pass through the high speed pumps 17, through a cold trap 13, 15, and back into the target chamber 70. The cold traps 13, 15 will remove heavier gasses that in time can contaminate the system due to very small leaks.

In another construction, the fusion portions 10, 11 are arranged in either the magnetic configuration or the linear configuration and are operated as neutron sources for isotope production. The system will be operated as discussed above with the magnetic target chamber or with the linear target chamber 70. A solid sample, such as solid foil of parent material Mo-98 will be placed proximal to the target chamber 60, 70. Neutrons created in the target chamber 60, 70 will penetrate the walls of the target chamber 60, 70 and react with the Mo-98 parent material to create Mo-99, which may decay to meta-stable Tn-99m. The Mo-99 will be detected using suitable instrumentation and technology known in the art.

In still other constructions, the fusion portions 10, 11 are arranged as proton sources for the production of isotopes. In these construction, the fusion portion 10, 11 will be operated as described above with the magnetic target chamber 60 or with the linear target chamber 70. The system will include an isotope extraction system inside the target chamber 60, 70. Parent material such as water comprising $H_2{}^{16}O$ will be flowed through the isotope extraction system. The protons generated in the target chamber will penetrate the walls of the isotope extraction system to react with the $^{16}O$ to produce $^{13}N$. The $^{13}N$ product material will be extracted from the parent and other material using an ion exchange resin. The $^{13}N$ will be detected using suitable instrumentation and technology known in the art.

In summary, each fusion portion 10, 11 provides, among other things, a compact high energy proton or neutron source. The foregoing description is considered as illustrative only of the principles of the fusion portion 10, 11. Further, since numerous modifications and changes will readily occur to those skilled in the art, it is not desired to limit the fusion portion 10, 11 to the exact construction and operation shown and described, and accordingly, all suitable modifications and equivalents may be resorted to as required or desired.

As illustrated in FIGS. 22 and 23, the fission portions 400a, 400b of the hybrid reactor 5a, 5b are positioned adjacent the target chambers 60, 70 of a plurality of fusion portions 10, 11. The fusion portions 10, 11 are arranged such that a reaction space 405 is defined within the target chambers 60, 70. Specifically, the ion trajectories within the target chambers 60, 70 do not enter the reaction space 405, and so materials to be irradiated can be placed within that volume. In order to further increase the neutron flux, multiple fusion portions 10, 11 are stacked on top of one another, with as many as ten sources being beneficial. As illustrated in FIG. 22, the hybrid reactor 5a includes the fission portion 400a and fusion portions 10 in the magnetic arrangement to produce a plurality of stacked target chambers 60 that are pancake shaped but in which the ion beam flows along an annular path. Thus, the reaction space 405 within the annular path can be used for the placement of materials to be irradiated.

FIG. 23 illustrates a linear arrangement of the fusion portions 11 coupled to the fission portion 400b to define the hybrid reactor 5b. In this construction, the ion beams are directed along a plurality of substantially parallel, spaced-apart linear paths positioned within an annular target chamber 70. The reaction space 405 (sometimes referred to as reaction chamber) within the annular target chamber 70 is suitable for the placement of materials to be irradiated. Thus, as will become apparent, the fission portions 400a, 400b described with regard to FIGS. 24-29 could be employed with either the magnetic configuration or the linear configuration of the fusion portions 10, 11.

With reference to FIGS. 22 and 23 the fission portion 400a, 400b includes a substantially cylindrical activation column 410 (sometimes referred to as an activation cell) positioned within a tank 415 that contains a moderator/reflector material selected to reduce the radiation that escapes from the fission portion 400a, 400b during operation. An attenuator may be positioned proximate the activation cell and selected to maintain the fission reaction at a subcritical level, a reflector may be positioned proximate the target chamber and selected to reflect neutrons toward the activation cell, and a moderator may substantially surround the activation cell, the attenuator, and the reflector. The activation column 410 is positioned within the target chamber 60, 70 where the fusion reactions occur. The target chamber 60, 70 is about 1 m tall. A layer of beryllium 420 may surround the target chamber 60, 70. The moderating material is typically $D_2O$ or $H_2O$. In addition, a gas regeneration system 425 is positioned on top of the tank 415. An aperture 430 in the center of the gas regeneration system 425 extends into the activation column 410 where a sub-critical assembly 435 including a LEU mixture and/or other parent material may be located. In preferred constructions, the aperture 430 has about a 10 cm radius and is about 1 m long.

Each fusion portion 10, 11 is arranged to emit high energy neutrons from the target chamber. The neutrons emitted by the fusion portions 10, 11 are emitted isotropically, and while at high energy those that enter the activation column 410 pass through it with little interaction. The target chamber is surrounded by 10-15 cm of beryllium 420, which multiplies the fast neutron flux by approximately a factor of two. The neutrons then pass into the moderator where they slow to thermal energy and reflect back into the activation cell 410.

It is estimated that the neutron production rate from this configuration is about $10^{15}$ n/s (the estimated source strength for a single fusion portion 10, 11 operating at 500 kV and 100 mA is $10^{14}$ n/s and there are ten of these devices in the illustrated construction). The total volumetric flux in the activation cell 410 was calculated to be 2.35*1012 n/cm$^2$/s with an uncertainty of 0.0094 and the thermal flux (less than 0.1 eV) was 1.34*10$^{12}$ n/cm$^2$/s with an uncertainty of 0.0122. This neutron rate improves substantially with the presence of LEU as will be discussed.

As discussed with regard to FIGS. 1 and 3, the fusion portion 10, 11 can be arranged in the magnetic arrangement or the linear arrangement. The real advantage of the magnetic arrangement of the fusion portions 10, 11 is that they allow for a long path length in a relatively low pressure gas. To effectively use the linear configuration, the target gas must be cooled and must be maintained at a higher pressure. One example of such a configuration would have several deuterium beam lines shooting axially into the target chamber 70 from above and below the device as illustrated in FIG. 23. While the target chambers 70 may need to operate at up to 10 torr for this to be successful, it may be a simpler and more efficient approach for the fusion portion 10, 11.

The primary simplification in the linear configuration is the elimination of the components needed to establish the magnetic field that guides the beam in the spiral or helical pattern. The lack of the components needed to create the field makes the device cheaper and the magnets do not play a role in attenuating the neutron flux. However, in some constructions, a magnetic field is employed to collimate the ion beam produced by the linear arrangement of the fusion portions 11, as will be discussed.

In order to produce Mo-99 of high specific activity as an end product, it should be made from a material that is chemically different so that it can be easily separated. The most common way to do this is by fission of $^{235}$U through neutron bombardment. The fusion portions 10, 11 described previously create sufficient neutrons to produce a large amount of Mo-99 with no additional reactivity, but if $^{235}$U is already present in the device, it makes sense to put it in a configuration that will provide neutron multiplication as well as providing a target for Mo-99 production. The neutrons made from fission can play an important role in increasing the specific activity of the Mo-99, and can increase the total Mo-99 output of the system. The multiplication factor, $k_{eff}$ is related to the multiplication by equation $1/(1-k_{eff})$. This multiplication effect can result in an increase of the total yield and specific activity of the end product by as much as a factor of 5-10. $k_{eff}$ is a strong function of LEU density and moderator configuration.

Several subcritical configurations of subcritical assemblies 435 which consist of LEU (20% enriched) targets combined with $H_2O$ (or $D_2O$) are possible. All of these configurations are inserted into the previously described reaction chamber space 405. Some of the configurations considered include LEU foils, an aqueous solution of a uranium salt dissolved in water, encapsulated $UO_2$ powder and others. The aqueous solutions are highly desirable due to excellent moderation of the neutrons, but provide challenges from a criticality perspective. In order to ensure subcritical operation, the criticality constant, $k_{eff}$ should be kept below 0.95. Further control features could easily be added to decrease $k_{eff}$ if a critical condition were obtained. These control features include, but are not limited to control rods, injectable poisons, or pressure relief valves that would dump the moderator and drop the criticality.

Figure 25:
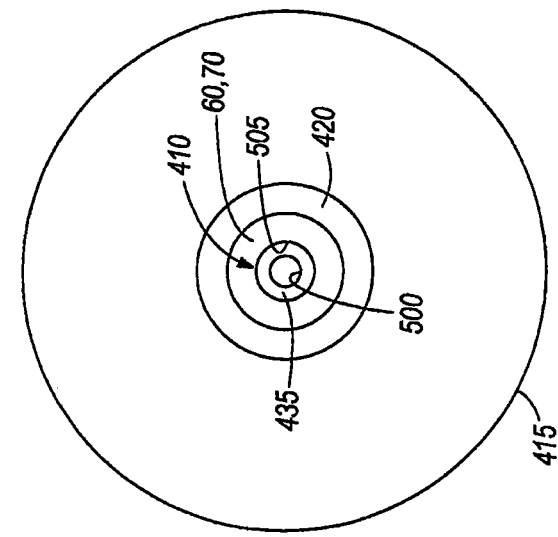
FIG. 25 is a top schematic view of the fission reactor of FIG. 24 illustrating the various layers of material.
Figure 24:
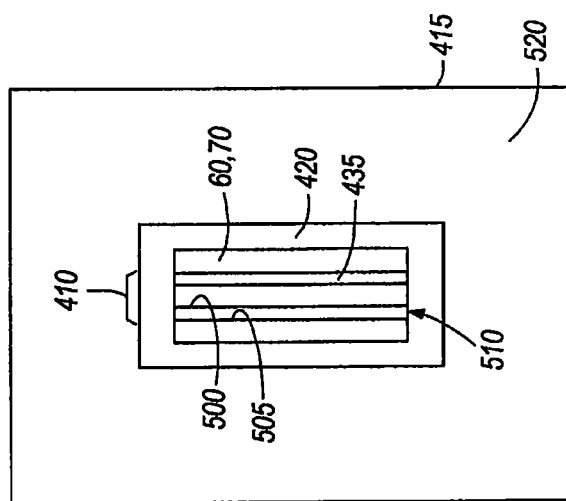
FIG. 24 is a side schematic view of the fission reactor illustrating the various layers of material.

Aqueous solutions of uranium offer tremendous benefits for downstream chemical processes. Furthermore, they are easy to cool, and provide an excellent combination of fuel and moderator. Initial studies were performed using a uranium nitrate solution-$UO_2(NO_3)_2$, but other solutions could be considered such as uranium sulfate or others. In one construction, the salt concentration in the solution is about 66 g of salt per 100 g $H_2O$. The solution is positioned within the activation cell 410 as illustrated in FIGS. 24 and 25. In addition to the solution, there is a smaller diameter cylinder 500 in the center of the activation cell 410 filled with pure water. This cylinder of water allows the value of $k_{eff}$ to be reduced so that the device remains subcritical, while still allowing for a large volume of LEU solution to be used.

In the aqueous solution layout illustrated in FIGS. 24 and 25, the central most cylinder 500 contains pure water and is surrounded by an aqueous mixture of uranium nitrate that is contained between the tube and a cylindrical wall 505 that cooperate to define a substantially annular space 510. The target chamber 60, 70 is the next most outward layer and is also annular. The pure water, the aqueous mixture of uranium nitrate, and the target chamber 60, 70 are surrounded by the Be multiplier/reflector 420. The outermost layer 520 in this case is a large volume of $D_2O$ contained within the tank 415. The $D_2O$ acts as a moderator to reduce radiation leakage from the fission portion 400a, 400b. FIGS. 26-29 illustrate similar structural components but contain different materials within some or all of the volumes as will be discussed with those particular figures.

A common method to irradiate uranium is to form it into either uranium dioxide pellets or encase a uranium dioxide powder in a container. These are inserted into a reactor and irradiated before removal and processing. While the $UO_2$ powders being used today utilize HEU, it is preferable to use LEU. In preferred constructions, a mixture of LEU and $H_2O$ that provides $K_{eff}<0.95$ is employed.

Figure 27:
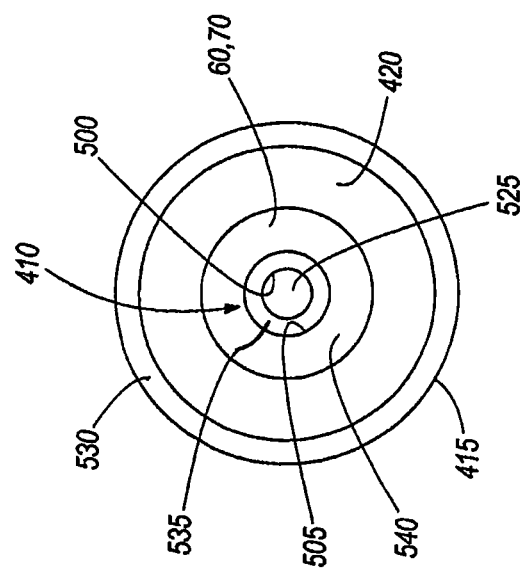
FIG. 27 is a top schematic view of the fission reactor of FIG. 26 illustrating the various layers of material.
Figure 26:
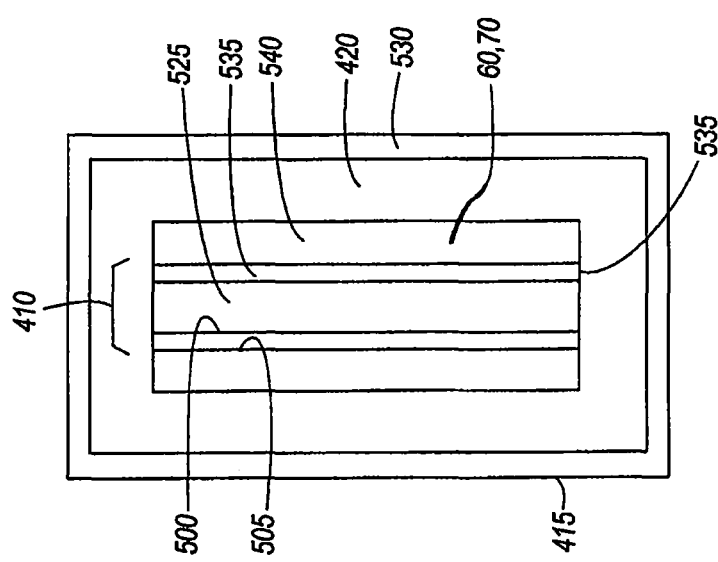
FIG. 26 is a side schematic view of another fission reactor illustrating the various layers of material.

FIGS. 26 and 27 illustrate an activation column 410 that includes $UO_2$ in a homogeneous solution with $D_2O$. The center cylinder 500 in this construction is filled with $H_2O$ 525, as is the outermost layer 530 (only a portion of which is illustrated). The first annular space 535 contains a solution of 18% LEU (20% enriched) and 82% $D_2O$. The second annular layer 540 is substantially evacuated, consistent with the fusion portion target chambers 60, 70. The center cylinder 500, the first annular space 535, and the second annular space 540 are surrounded by a layer of Be 420, which serves as a multiplier and neutron reflector.

In another construction, Mo-99 is extracted from uranium by chemical dissolution of LEU foils in a modified Cintichem process. In this process, thin foils containing uranium are placed in a high flux region of a nuclear reactor, irradiated for some time and then removed. The foils are dissolved in various solutions and processed through multiple chemical techniques.

From a safety, non-proliferation, and health perspective, a desirable way to produce Mo-99 is by (n,γ) reactions with parent material Mo-98. This results in Mo-99 with no contamination from plutonium or other fission products. Production by this method also does not require a constant feed of any form of uranium. The disadvantage lies in the difficulty of separating Mo-99 from the parent Mo-98, which leads to low specific activities of Mo-99 in the generator. Furthermore, the cost of enriched Mo-98 is substantial if that is to be used. Still, considerable progress has been made in developing new elution techniques to extract high purity Tc-99m from low specific activity Mo-99, and this may become a cost-effective option in the near future. To implement this type of production in the hybrid reactor 5a, 5b illustrated herein, a fixed subcritical assembly 435 of LEU can be used to increase the neutron flux (most likely UO$_2$), but can be isolated from the parent Mo-98. The subcritical assembly 435 is still located inside of the fusion portion 10, 11, and the Mo-99 activation column would be located within the subcritical assembly 435.

Figure 29:
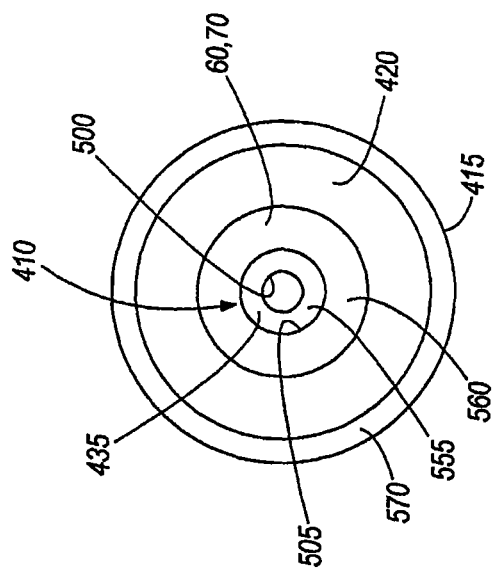
FIG. 29 is a top schematic view of the fission reactor of FIG. 28 illustrating the various layers of material.
Figure 28:
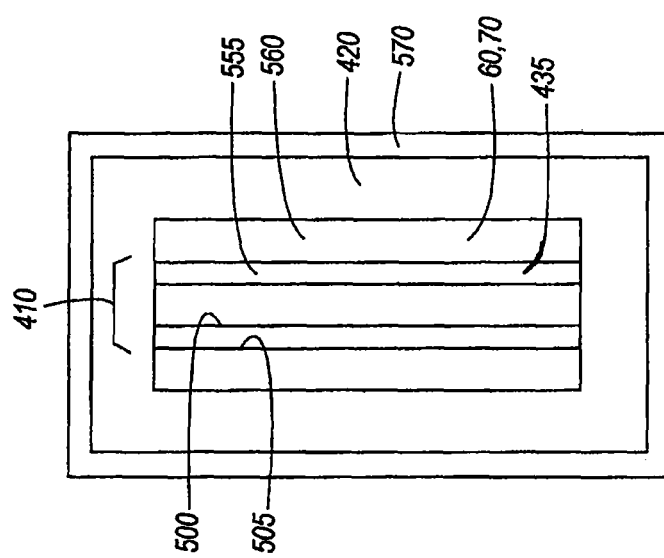
FIG. 28 is a side schematic view of another fission reactor illustrating the various layers of material and particularly suited to the formation of Mo-99 from Mo-98.

In preferred constructions, Mo-98 occupies a total of 20% of the activation column 410 (by volume). As illustrated in FIGS. 28 and 29, the centermost cylinder 500 contains a homogeneous mixture of 20% Mo-98 and H$_2$O. The first annular layer 555 includes a subcritical assembly 435 and is comprised of an 18% LEU (20% enriched)/D$_2$O mixture. The second annular layer 560 is substantially evacuated, consistent with the fusion portion target chambers 60, 70. The center cylinder 500, the first annular space 555, and the second annular space 560 are surrounded by the layer of Be 420, which serves as a multiplier and neutron reflector. The outermost layer 570 (only a portion of which is illustrated) contains water that reduces the amount of radiation that escapes from the fission portion 5a, 5b.

For the LEU cases, the production rate and specific activity of Mo-99 was determined by calculating 6% of the fission yield, with a fusion portion 10, 11 operating at $10^{15}$ n/s. $K_{eff}$ was calculated for various configurations as well. Table 1 summarizes the results of these calculations. In the case of production from Mo-98, an (n,γ) tally was used to determine the production rate of Mo-99. The following table illustrates the production rates for various target configurations in the hybrid reactor 5a, 5b.

| Target Configuration | $K_{eff}$ | Mo-99 yield/ g U (or Mo-98) (Ci) | Total Mo-99 yield @ saturation (6 day kCi) |
| --- | --- | --- | --- |
| Aqueous UO$_2$(NO$_3$)$_2$ | 0.947 | 1.51 | 2.93 |
| UO$_2$ powder | 0.945 | 2.92 | 22 |
| Natural Mo (w subcritical) | 0.943 | 0.68 | 2.69 |
| Mo-98 (w subcritical) | 0.943 | 2.83 | 11.1 |
| Natural Mo (w/o subcritical) | — | 0.085 | 0.44 |
| Mo-98 (w/o subcritical) | — | 0.35 | 1.8 |

While the specific activity of Mo-99 generated is relatively constant for all of the subcritical cases, some configurations allow for a substantially higher total production rate. This is because these configurations allow for considerably larger quantities of parent material. It is also worth noting that production of Mo-99 from Mo-98 is as good a method as production from LEU when it comes to the total quantity of Mo-99 produced. Still, the LEU process tends to be more favorable as it is easier to separate Mo-99 from fission products than it is to separate it from Mo-98, which allows for a high specific activity of Mo-99 to be available after separation.

In constructions in which Mo-98 is used to produce Mo-99, the subcritical assembly 435 can be removed altogether. However, if the subcritical assembly 435 is removed, the specific activity of the end product will be quite a bit lower. Still, there are some indications that advanced generators might be able to make use of the low specific activity resulting from Mo-98 irradiation. The specific activity produced by the hybrid reactor 5a, 5b without subcritical multiplication is high enough for some of these technologies. Furthermore, the total demand for U.S. Mo-99 could still be met with several production facilities, which would allow for a fission free process.

For example, in one construction of a fusion only reactor, the subcritical assembly 435 is omitted and Mo-98 is positioned within the activation column 410. To enhance the production of Mo-99, a more powerful ion beam produced by the linear arrangement of the fusion portion 11 is employed. It is preferred to operate the ion beams at a power level approximately ten times that required in the aforementioned constructions. To achieve this, a magnetic field is established to collimate the beam and inhibit the undesirable dispersion of the beams. The field is arranged such that it is parallel to the beams and substantially surrounds the accelerator 30 and the pumping system 40 but does not necessarily extend into the target chamber 70. Using this arrangement provides the desired neutron flux without the multiplicative effect produced by the subcritical assembly 435. One advantage of this arrangement is that no uranium is required to produce the desired isotopes.

Thus, the invention provides, among other things, a segmented activation cell 600 for use in producing medical isotopes. The segmented activation cell may be used, for example, with a hybrid reactor 5a, 5b. The constructions of the hybrid reactor 5a, 5b described above and illustrated in the figures are presented by way of example only and are not intended as a limitation upon the concepts and principles of the invention.

We claim:

1. A reactor operable to produce an isotope, the reactor comprising: an activation cell for containing controlled nuclear fission reactions, the activation cell segmented into n independent compartments, wherein n is an integer greater than or equal to 2, wherein the n compartments are radially disposed about a central axis of the activation cell, wherein the n compartments collectively comprise the annular activation cell that is concentrically disposed about a target chamber, wherein each of the compartments is configured for containing a parent material in an aqueous solution, wherein the parent material interacts with neutrons to produce the isotope via fission reactions in each compartment, and wherein the compartments are configured proximal to each other to facilitate neutron multiplication.

2. The reactor of claim 1, wherein the fission reactions are maintained at a subcritical level, and driven by a neutron source.

3. The reactor of claim 2, wherein the neutron source comprises the target chamber and an ion source, the ion source operable to produce an ion beam from a gas, wherein the target chamber contains a target, the target interacting with the ion beam to produce neutrons.

4. The reactor of claim 2, wherein the ion source and the target chamber together at least partially define a fusion reactor.

5. The reactor of claim 1, wherein the parent material comprises uranium.

6. The reactor of claim 5, wherein the parent material comprises low enriched U-235.

7. The reactor of claim 1, wherein the isotope comprises Mo-99.

8. The reactor of claim 1, wherein the isotope comprises Mo-99, I-131, I-125, Xe-133, Cs-137, Co-60, or Sr-89.

9. The reactor of claim 1, wherein at least two adjacent compartments share a divider.

10. The reactor of claim 9, comprising a plurality of dividers, each divider dividing at least two adjacent compartments.

11. The reactor of claim 9, wherein the divider physically separates the adjacent compartments.

12. The reactor of claim 1, wherein the plurality of compartments is configured for interaction of the parent material with neutrons simultaneously in each compartment.

13. The reactor of claim 1, wherein the compartments are circumferentially arranged in series.

14. The reactor of claim 1, wherein the target chamber is in a concentric relationship with at least one pair of diametrically opposed compartments.

15. The reactor of claim 3, wherein the target interacts with the ion beam to produce neutrons via a fusion reaction.

16. A reactor operable to produce an isotope, the reactor comprising:
   a target chamber; and
   an annular activation cell, wherein the annular activation cell is segmented into a plurality of independent compartments, each of the compartments configured for containing a parent material in an aqueous solution,
   wherein the plurality of compartments collectively comprises the annular activation cell that is concentrically disposed about the target chamber,
   wherein the compartments are radially disposed about a central axis of the annular activation cell and the compartments are circumferentially arranged in series,
   wherein the parent material interacts with neutrons to produce the isotope via fission reactions in each compartment, and
   wherein the compartments are configured proximal to each other to facilitate neutron multiplication.

17. The reactor of claim 16, wherein the target chamber is concentric to the annular activation cell.

18. The reactor of claim 16, wherein the fission reactions are maintained at a subcritical level and driven by a neutron source, the neutron source comprising the target chamber and an ion source, the ion source operable to produce an ion beam from a gas, and wherein the target chamber contains a target, the target interacting with the ion beam to produce neutrons via fusion reactions.

* * * * *